(12) United States Patent
Annau et al.

(10) Patent No.: US 9,930,238 B2
(45) Date of Patent: Mar. 27, 2018

(54) IMAGE STITCHING

(71) Applicant: Jaunt Inc., Palo Alto, CA (US)

(72) Inventors: Thomas M. Annau, Palo Alto, CA (US); Arthur Van Hoff, Palo Alto, CA (US); Daniel Kopeinigg, Palo Alto, CA (US)

( * ) Notice: Subject to any disclaimer, the term of this patent is extended or adjusted under 35 U.S.C. 154(b) by 476 days.

(21) Appl. No.: 14/465,581

(22) Filed: Aug. 21, 2014

(65) Prior Publication Data

US 2015/0054913 A1 Feb. 26, 2015

Related U.S. Application Data

(60) Provisional application No. 61/868,527, filed on Aug. 21, 2013, provisional application No. 62/004,645, (Continued)

(51) Int. Cl.
*H04N 5/232* (2006.01)
*H04N 13/02* (2006.01)
(Continued)

(52) U.S. Cl.
CPC ..... *H04N 5/23206* (2013.01); *G06F 3/04815* (2013.01); *G06F 3/04847* (2013.01);
(Continued)

(58) Field of Classification Search
CPC combination set(s) only.
See application file for complete search history.

(56) References Cited

U.S. PATENT DOCUMENTS

| 4,507,683 A | 3/1985 | Griesshaber et al. |
| 5,495,576 A * | 2/1996 | Ritchey ............... G06T 17/00 345/420 |

(Continued)

FOREIGN PATENT DOCUMENTS

| RU | 2421933 C2 * | 3/2003 |
| RU | 2382406 C1 * | 10/2008 |

(Continued)

OTHER PUBLICATIONS

KIPO, International Serach Report and Written Opinion for International Patent Application No. PCT/US2014/051136, dated Nov. 11, 2014, 7 pages.
USPTO, Non-final Office Action for U.S. Appl. No. 14/444,938, dated Aug. 17, 2015, 19 pages.
USPTO, Final Office Action for U.S. Appl. No. 14/444,938, dated Dec. 31, 2015, 30 pages.
USPTO, Notice of Allowance for U.S. Appl. No. 14/444,938, dated Jun. 15, 2016, 16 pages.

(Continued)

*Primary Examiner* — Sath V Perungavoor
*Assistant Examiner* — Janese Duley
(74) *Attorney, Agent, or Firm* — Burbage Law, P.C.; Jon-Michael Burbage

(57) ABSTRACT

The disclosure includes a system and method for stitching image frames. The system includes a processor and a memory storing instructions that, when executed, cause the system to: receive image frames that are captured by two or more camera modules at a particular time; interpolate a virtual camera between a first set of camera modules from the two or more camera modules; determine a set of disparity maps between the first set of camera modules; generate, based on the set of disparity maps, a virtual camera image associated with the particular time for the virtual camera from a set of image frames captured by the first set of camera modules at the particular time; and construct a left panoramic image and a right panoramic image associated with the particular time from the image frames captured by the two or more camera modules and the virtual camera image.

22 Claims, 21 Drawing Sheets

Related U.S. Application Data filed on May 29, 2014, provisional application No. 62/008,215, filed on Jun. 5, 2014, provisional application No. 62/029,254, filed on Jul. 25, 2014.

(51) Int. Cl.

| | | |
|---|---|---|
| *G11B 27/11* | (2006.01) | |
| *G11B 27/34* | (2006.01) | |
| *G11B 31/00* | (2006.01) | |
| *H04N 13/00* | (2018.01) | |
| *G06F 3/0481* | (2013.01) | |
| *G06F 3/0484* | (2013.01) | |
| *G06Q 30/02* | (2012.01) | |
| *G06T 3/40* | (2006.01) | |
| *G06T 7/00* | (2017.01) | |
| *H04N 5/247* | (2006.01) | |
| *H04N 7/18* | (2006.01) | |

(52) U.S. Cl.
CPC ....... *G06Q 30/0263* (2013.01); *G06T 3/4038* (2013.01); *G06T 7/97* (2017.01); *G11B 27/11* (2013.01); *G11B 27/34* (2013.01); *G11B 31/006* (2013.01); *H04N 5/23238* (2013.01); *H04N 5/247* (2013.01); *H04N 13/0007* (2013.01); *H04N 13/0011* (2013.01); *H04N 13/0242* (2013.01); *H04N 13/0271* (2013.01); *G06T 2207/10012* (2013.01); *G06T 2207/20228* (2013.01); *H04N 7/181* (2013.01)

(56) References Cited

U.S. PATENT DOCUMENTS

| | | | |
|---|---|---|---|
| 6,141,034 | A | 10/2000 | McCutchen |
| 9,001,226 | B1 | 4/2015 | Ng et al. |
| 2001/0015751 | A1 | 8/2001 | Geng |
| 2002/0075295 | A1 | 6/2002 | Stentz et al. |
| 2004/0027451 | A1 | 2/2004 | Baker |
| 2004/0066449 | A1 | 4/2004 | Givon |
| 2004/0246333 | A1 | 12/2004 | Steuart |
| 2007/0035627 | A1 | 2/2007 | Cleary et al. |
| 2007/0146530 | A1 | 6/2007 | Nose |
| 2007/0263076 | A1 | 11/2007 | Andrews et al. |
| 2010/0045773 | A1 | 2/2010 | Ritchey |
| 2010/0315479 | A1 | 12/2010 | Wijngaarden et al. |
| 2011/0193956 | A1 | 8/2011 | Gilg et al. |
| 2011/0267510 | A1 | 11/2011 | Malone et al. |
| 2012/0069236 | A1 | 3/2012 | Namba et al. |
| 2012/0162362 | A1 | 6/2012 | Garden et al. |
| 2013/0044187 | A1 | 2/2013 | Hammes et al. |
| 2013/0188010 | A1 | 7/2013 | Dortch et al. |
| 2013/0250047 | A1 | 9/2013 | Hollinger |
| 2013/0278631 | A1 | 10/2013 | Border et al. |
| 2014/0071234 | A1 | 3/2014 | Millett |
| 2014/0097251 | A1 | 4/2014 | Joussen et al. |
| 2014/0099022 | A1 | 4/2014 | McNamer |
| 2014/0104378 | A1 | 4/2014 | Kauff et al. |
| 2014/0267596 | A1 | 9/2014 | Geerds |
| 2014/0270684 | A1 | 9/2014 | Jayaram et al. |
| 2014/0285486 | A1 | 9/2014 | Chang et al. |
| 2014/0368609 | A1 | 12/2014 | Chang et al. |
| 2016/0037026 | A1 | 2/2016 | Kintner |
| 2016/0037030 | A1 | 2/2016 | Weissig et al. |

FOREIGN PATENT DOCUMENTS

| | | |
|---|---|---|
| RU | 2382406 C1 * | 2/2010 |
| RU | 2421933 C2 * | 6/2011 |

OTHER PUBLICATIONS

USPTO, Final Office Action for U.S. Appl. No. 14/465,575, dated Jun. 15, 2017, 10 pages.

USPTO, Non-final Office Action for U.S. Appl. No. 14/465,575, dated Jul. 6, 2016, 10 pages.

\* cited by examiner

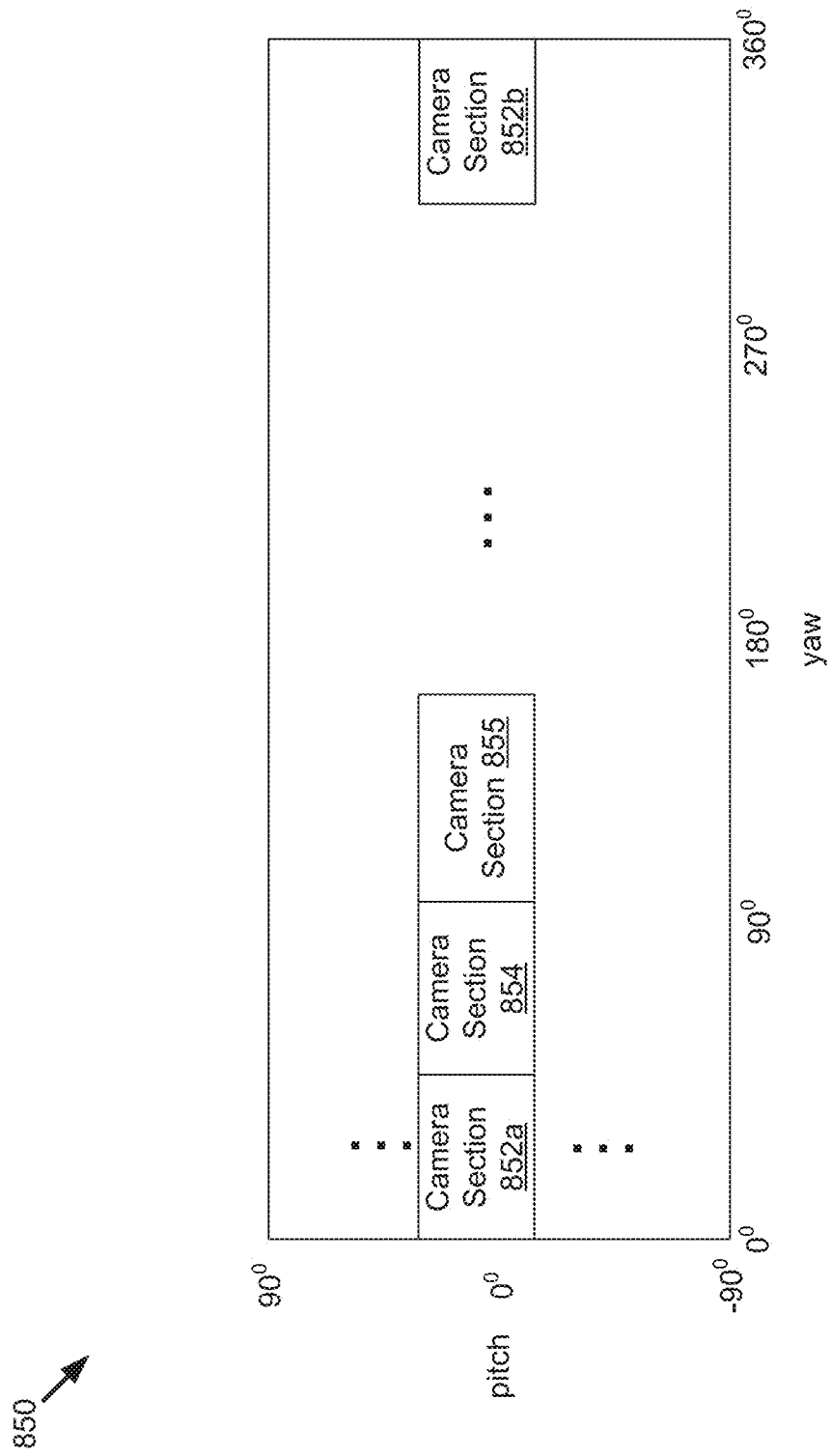

IMAGE STITCHING

CROSS REFERENCE TO RELATED APPLICATIONS

This application claims priority under 35 USC § 119(e) to U.S. application Ser. No. 61/868,527, entitled "Panoptic Virtual Presence System and Method" filed Aug. 21, 2013, U.S. application Ser. No. 62/004,645, entitled "Camera Array Including Camera Modules" filed May 29, 2014, U.S. application Ser. No. 62/008,215, entitled "Color Consensus" filed Jun. 5, 2014, and U.S. application Ser. No. 62/029,254, entitled "Virtual Presence" filed Jul. 25, 2014. In addition, this application is related to U.S. application Ser. No. 14/444,938, entitled "Camera Array Including Camera Modules" filed Jul. 28, 2014, U.S. application Ser. No. 14/465,575, entitled "Aggregating Images and Audio Data to Generate Virtual Reality Content" filed Aug. 21, 2014 and U.S. application Ser. No. 14/465,570, entitled "Generating Content for a Virtual Reality System" filed Aug. 21, 2014. Each of the foregoing applications is herein incorporated in its entirety by reference.

FIELD

The implementations discussed herein are related to a virtual presence system and method. More particularly, the implementations discussed herein relate to stitching two or more images together to form a three-dimensional (3D) panoramic image.

BACKGROUND

Two or more cameras located in different positions may capture images of a common scene. The images from the two or more cameras may be stitched together to form an aggregated image for the common scene. However, due to the disparity between the cameras, the aggregated image may have stitching artifacts (or, stitching errors) where the viewing angle switches from a first camera to a next neighboring camera. Objects that are far away from the cameras may have negligible disparity and there may be no stitching errors for the far-away objects. However, objects that are close to the cameras may have noticeable disparity and there may be stitching errors for the close-by objects. For example, close-by objects that cross a stitching boundary may abruptly transition between viewing angles and may thus produce an obvious visual discontinuity. This may be referred to as a "close object problem."

The subject matter claimed herein is not limited to implementations that solve any disadvantages or that operate only in environments such as those described above. Rather, this background is only provided to illustrate one example technology area where some implementations described herein may be practiced.

SUMMARY

According to one innovative aspect of the subject matter described in this disclosure, a system for stitching image frames to generate a left panoramic image and a right panoramic image includes one or more processors and one or more non-transitory tangible computer readable mediums communicatively coupled to the one or more processors and storing executable instructions executable by the one or more processors to perform operations including: receiving image frames that are captured by two or more camera modules of a camera array at a particular time; interpolating a first virtual camera between a first set of camera modules from the two or more camera modules; determining a first set of disparity maps between the first set of camera modules; generating a first virtual camera image associated with the particular time for the first virtual camera from a first set of image frames that are captured by the first set of camera modules at the particular time, the first virtual camera image being generated based on the first set of disparity maps; and constructing a left panoramic image and a right panoramic image associated with the particular time from the image frames captured by the two or more camera modules and the first virtual camera image of the first virtual camera.

In general, another innovative aspect of the subject matter described in this disclosure may be embodied in methods that include: receiving image frames that are captured by two or more camera modules of a camera array at a particular time; interpolating a first virtual camera between a first set of camera modules from the two or more camera modules; determining a first set of disparity maps between the first set of camera modules; generating a first virtual camera image associated with the particular time for the first virtual camera from a first set of image frames that are captured by the first set of camera modules at the particular time, the first virtual camera image being generated based on the first set of disparity maps; and constructing a left panoramic image and a right panoramic image associated with the particular time from the image frames captured by the two or more camera modules and the first virtual camera image of the first virtual camera.

Other aspects include corresponding methods, systems, apparatus, and computer program products for these and other innovative aspects.

The object and advantages of the implementations will be realized and achieved at least by the elements, features, and combinations particularly pointed out in the claims.

It is to be understood that both the foregoing general description and the following detailed description are exemplary and explanatory and are not restrictive of the disclosure, as claimed.

BRIEF DESCRIPTION OF THE DRAWINGS

Example implementations will be described and explained with additional specificity and detail through the use of the accompanying drawings in which:

FIG. 8C is a graphic representation that illustrates an example camera map according to some implementations;

DETAILED DESCRIPTION OF SOME EXAMPLE IMPLEMENTATIONS

Figure 1:
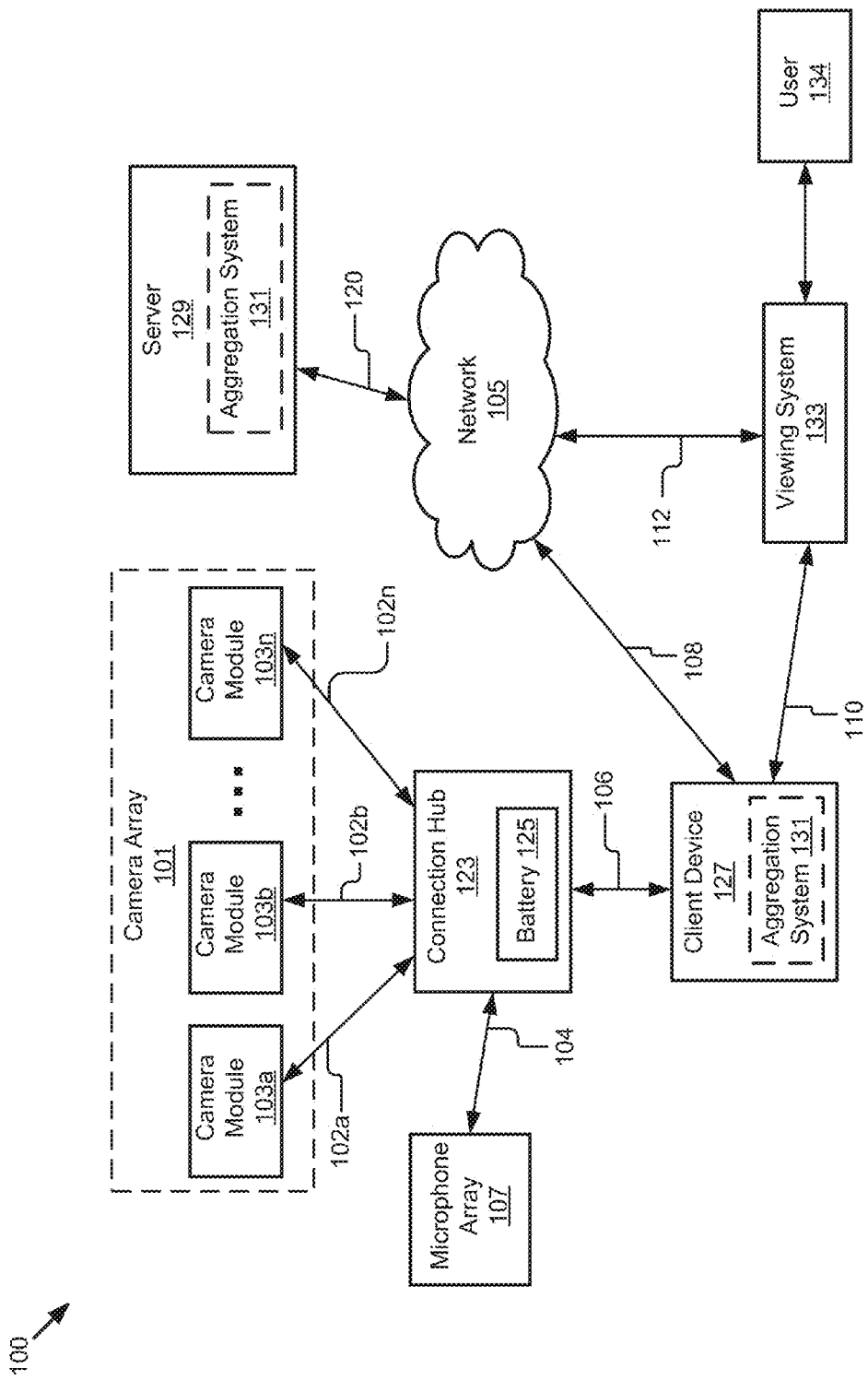
FIG. 1 illustrates a block diagram of some implementations of an example system that collects and aggregates image frames and audio data to generate VR content.

The present disclosure relates to stitching images to form a panoramic image.

Image stitching errors may be resulted from one or more sources that include, but are not limited to: a first source that includes errors in measurement of physical properties of cameras (e.g., errors in spatial positions, rotations, focus, and focal lengths of the cameras); a second source that includes mismatch between image measurement properties of the cameras (e.g., mismatch in brightness, contrast, and color); and a third source that includes disparity in viewing angles of close-by objects from different cameras.

The stitching errors caused by the first and second sources may be removed through camera calibration. For example, objects with known colors, brightness, contrast, spatial orientations, and positions may be used to characterize each camera and adjust camera parameters (e.g., focus, sensor gain, white balance) prior to using the cameras to capture image frames. Alternatively or additionally, overlapping images between cameras may be analyzed, and image post-processing techniques may be used to adjust camera model parameters to reduce difference between the overlapping images.

The stitching errors caused by the third source may be reduced or eliminated by increasing the number of camera modules (also referred to as real cameras) in a camera array to approach an ideal of a single, continuous, and spherical image sensor. This mechanism may reduce the viewing angle discrepancy between neighboring cameras and may thus reduce the stitching artifacts. In some implementations, rather than adding more real cameras into the camera array, an increasing camera density may be achieved by interpolating virtual cameras between real cameras in the camera array. This approach may be achieved by interpolating images from real cameras based at least in part on an estimation of the spatial proximity or depth of each image pixel (e.g., a depth map) to generate virtual camera images for the virtual cameras. For example, to approximate shifting a camera view to the left, pixels in the image may shift to the right based on the pixels' estimated proximity to the camera. A first pixel that is closer to the camera than a second pixel may shift a longer distance to the right than the second pixel in order to simulate parallax. The virtual camera image generated from the pixel shifting may be improved by combining shifted views from all nearby cameras.

In some implementations, a depth map may be computed using standard stereoscopic algorithms or obtained with a depth sensor such as the PrimeSense depth sensor. The depth map does not need to be entirely accurate as long as the errors produce no visible difference in the interpolated views. For example, a featureless background may present as an identical image regardless of viewing positions or angles to the background. Errors in the background's depth estimation may not affect image interpolation since the featureless background is invariant to pixel shifting.

In some implementations, an aggregation system described herein may interpolate virtual cameras between camera modules in the camera array to simulate an increasing camera density. A virtual camera may be a camera whose view is not directly observed. For example, a virtual camera may be a camera whose view may be estimated from image data collected from real camera sensors or virtual camera image data of other virtual cameras. A virtual camera may represent a simulated camera that locates between two or more neighboring camera modules. A position, orientation, field of view, depth of field, focal length, exposure, and white balance, etc., of the virtual camera may be different from the two or more neighboring camera modules that the virtual camera is based on.

The virtual camera may have a virtual camera image estimated from two or more image frames captured by the two or more neighboring camera modules. In some implementations, the virtual camera may be located in a particular position between the two or more neighboring camera modules, and the virtual camera image of the virtual camera may represent an estimated camera view from the particular position located between the neighboring camera modules. For example, the camera array with multiple camera modules may be housed around a spherical case. A virtual camera may be determined for an arbitrary angular position around the spherical case and its virtual camera image may also be estimated for the arbitrary angular position, which simulates a continuous rotation of point of view around the sphere even though the camera array may only capture discrete view points by the discrete camera modules. In some implementations, a virtual camera may also be estimated by interpolating between two real cameras. A real camera may refer to a camera module in the camera array. Alternatively, a virtual camera may also be interpolated between a real camera and another virtual camera. Alternatively, a virtual camera may be interpolated between two other virtual cameras.

In some implementations, the aggregation system may estimate a virtual camera image for a virtual camera located between a first camera and a second camera by: estimating disparity maps between the first and second cameras; determining image frames of the first and second cameras; and generating the virtual camera image by shifting and combining the image frames of the first and second cameras based on the disparity maps. The first camera may be a real camera or a virtual camera. The second camera may also be a real camera or a virtual camera.

In some implementations, the aggregation system may receive video data describing image frames captured by camera modules in the camera array and may process the video data to generate a stream of 3D video data. For example, the aggregation system may determine virtual cameras interpolated in the camera array, estimate virtual camera images for the virtual cameras, stitch the image frames and the virtual camera images into two panoramic 3D video streams for left and right eye viewing, such as a stream of left panoramic images for left eye viewing and a stream of right panoramic images for right eye viewing. The stream of 3D video data includes the streams of left and right panoramic images.

Implementations of the present disclosure will be explained with reference to the accompanying drawings.

FIG. 1 illustrates a block diagram of some implementations of an example system 100 that collects and aggregates image frames and audio data to generate VR content, arranged in accordance with at least some implementations described herein. The illustrated system 100 includes a camera array 101, a connection hub 123, a microphone array 107, a client device 127, and a viewing system 133. In some implementations, the system 100 additionally includes a server 129. The client device 127, the viewing system 133, and the server 129 may be communicatively coupled via a network 105. The system 100 may include other devices not shown in FIG. 1, such as a social network server, a content server, and an advertisement (ad) server, etc.

The separation of various components and servers in the implementations described herein should not be understood as requiring such separation in all implementations, and it should be understood that the described components and servers may generally be integrated together in a single component or server. Additions, modifications, or omissions may be made to the illustrated implementation without departing from the scope of the present disclosure, as will be appreciated in view of the present disclosure.

While FIG. 1 illustrates one camera array 101, one connection hub 123, one microphone array 107, one client device 127, one server 129, and one viewing system 133, the present disclosure applies to a system architecture having one or more camera arrays 101, one or more connection hubs 123, one or more microphone arrays 107, one or more client devices 127, one or more servers 129, and one or more viewing systems 133. Furthermore, although FIG. 1 illustrates one network 105 coupled to the entities of the system 100, in practice one or more networks 105 may be connected to these entities and the one or more networks 105 may be of various and different types.

The camera array 101 may be a modular camera system configured to capture raw video data that includes image frames. In the illustrated implementation shown in FIG. 1, the camera array 101 includes camera modules 103a, 103b . . . 103n (also referred to individually and collectively herein as camera module 103). While three camera modules 103a, 103b, 103n are illustrated in FIG. 1, the camera array 101 may include any number of camera modules 103. The camera array 101 may be constructed using individual cameras with each camera module 103 including one individual camera. In some implementations, the camera array 101 may also include various sensors including, but not limited to, a depth sensor, a motion sensor (e.g., a global positioning system (GPS), an accelerometer, a gyroscope, etc.), a sensor for sensing a position of the camera array 101, and other types of sensors.

The camera array 101 may be constructed using various configurations. For example, the camera modules 103a, 103b . . . 103n in the camera array 101 may be configured in different geometries (e.g., a sphere, a line, a cylinder, a cone, and a cubic, etc.) with the corresponding lenses in the camera modules 103a, 103b . . . 103n facing toward different directions. For example, the camera array 101 may include 32 Point Grey Blackfly Gigabit Ethernet cameras distributed around a 20 centimeter diameter sphere. Camera models that are different from the Point Grey Blackfly camera model may be included in the camera array 101. For example, in some implementations the camera array 101 may include a sphere whose exterior surface is covered in one or more optical sensors configured to render 3D images or video. The optical sensors may be communicatively coupled to a controller. The entire exterior surface of the sphere may be covered in optical sensors configured to render 3D images or video.

In some implementations, the camera modules 103 in the camera array 101 are configured to have a sufficient field of view overlap so that all objects can be seen from more than one view point. For example, the horizontal field of view for each camera module 103 included in the camera array 101 is 70 degrees. In some implementations, having the camera array 101 configured in such a way that an object may be viewed by more than one camera module 103 is beneficial for correcting exposure or color deficiencies in the images captured by the camera array 101.

Each of the camera modules 103 may include one or more processors, one or more memory devices (e.g., a secure digital (SD) memory card, a secure digital high capacity (SDHC) memory card, a secure digital extra capacity (SDXC) memory card, and a compact flash (CF) memory card, etc.), an optical sensor (e.g., semiconductor charge-coupled devices (CCD), active pixel sensors in complementary metal-oxide-semiconductor (CMOS), and N-type metal-oxide-semiconductor (NMOS, Live MOS), etc.), a depth sensor (e.g., PrimeSense depth sensor), a lens (e.g., a camera lens), and other suitable components.

In some implementations, the camera modules 103a, 103b . . . 103n in the camera array 101 may form a daisy chain in which the camera modules 103a, 103b . . . 103n are connected in sequence. The camera modules 103a, 103b . . . 103n in the camera array 101 may be synchronized through the daisy chain. One camera module (e.g., the camera module 103a) in the daisy chain may be configured as a master camera module that controls clock signals for other camera modules in the camera array 101. The clock signals may be used to synchronize operations (e.g., start operations, stop operations) of the camera modules 103 in the camera array 101. Through the synchronized start and stop operations of the camera modules 103, the image frames in the respective video data captured by the respective camera modules 103a, 103b . . . 103n are also synchronized.

Example implementations of the camera array 101 and camera modules 103 are described in U.S. application Ser. No. 14/444,938, titled "Camera Array Including Camera Modules," filed Jul. 28, 2014, which is herein incorporated in its entirety by reference.

The camera modules 103 may be coupled to the connection hub 123. For example, the camera module 103a is communicatively coupled to the connection hub 123 via a signal line 102a, the camera module 103b is communicatively coupled to the connection hub 123 via a signal line 102b, and the camera module 103n is communicatively coupled to the connection hub 123 via a signal line 102n. In some implementations, a signal line in the disclosure may represent a wired connection or any combination of wired connections such as connections using Ethernet cables, high-definition multimedia interface (HDMI) cables, universal serial bus (USB) cables, RCA cables, Firewire, Camera-Link, or any other signal line suitable for transmitting video data and audio data. Alternatively, a signal line in the disclosure may represent a wireless connection such as a wireless fidelity (Wi-Fi) connection or a Bluetooth connection.

The microphone array 107 may include one or more microphones configured to capture sounds from different directions in an environment. In some implementations, the microphone array 107 may include one or more processors and one or more memories. The microphone array 107 may include a heat dissipation element. In the illustrated implementation, the microphone array 107 is coupled to the connection hub 123 via a signal line 104. Alternatively or additionally, the microphone array 107 may be directly coupled to other entities of the system 100 such as the client device 127.

The microphone array 107 may capture sound from various directions. The sound may be stored as raw audio data on a non-transitory memory communicatively coupled to the microphone array 107. The microphone array 107 may detect directionality of the sound. The directionality of the sound may be encoded and stored as part of the raw audio data.

In some implementations, the microphone array 107 may include a Core Sound Tetramic soundfield tetrahedral microphone array following the principles of ambisonics, enabling reconstruction of sound from any arbitrary direction. For example, the microphone array 107 may include an ambisonics microphone mounted on top of the camera array 101 and used to record sound and sonic directionality. In some implementations, the microphone array 107 includes a Joseph Grado HMP-1 recording system, or any other microphone system configured according to the same or similar acoustical principles.

In some implementations, the camera modules 103 may be mounted around a camera housing (e.g., a spherical housing or a housing with another suitable shape). The microphone array 107 may include multiple microphones mounted around the same camera housing, with each microphone located in a different position. The camera housing may act as a proxy for the head-shadow sound-blocking properties of a human head. During playback of the recorded audio data, an audio track may be selected for a user's ear from a microphone that has a closest orientation to the user's ear. Alternatively, the audio track for the user's ear may be interpolated from audio tracks recorded by microphones that are closest to the user's ear.

The connection hub 123 may receive the raw audio data recorded by the microphone array 107 and forward the raw audio data to the client device 127 for processing and storage. The connection hub 123 may also receive and aggregate streams of raw video data describing image frames captured by respective camera modules 103. The connection hub 123 may then transfer the raw video data to the client device 127 for processing and storage. The connection hub 123 is communicatively coupled to the client device 127 via a signal line 106. In some examples, the connection hub 123 may be a USB hub. In some implementations, the connection hub 123 includes one or more batteries 125 for supplying power to the camera modules 103 in the camera array 101. Alternatively or additionally, one or more batteries 125 may be coupled to the connection hub 123 for providing power to the camera modules 103.

The client device 127 may be a processor-based computing device. For example, the client device 127 may be a personal computer, laptop, tablet computing device, smartphone, set top box, network-enabled television or any other processor based computing device. In some implementations, the client device 127 includes network functionality and is communicatively coupled to the network 105 via a signal line 108. The client device 127 may be configured to transmit data to the server 129 or to receive data from the server 129 via the network 105.

The client device 127 may receive raw video data and raw audio data from the connection hub 123. In some implementations, the client device 127 may store the raw video data and raw audio data locally in a storage device associated with the client device 127. Alternatively, the client device 127 may send the raw video data and raw audio data to the server 129 via the network 105 and may store the raw video data and the audio data on a storage device associated with the server 129. In some implementations, the client device 127 includes an aggregation system 131 for aggregating raw video data captured by the camera modules 103 to form 3D video data and aggregating raw audio data captured by the microphone array 107 to form 3D audio data. Alternatively or additionally, the aggregation system 131 may be operable on the server 129.

The aggregation system 131 may include a system configured to aggregate raw video data and raw audio data to generate a stream of 3D video data and a stream of 3D audio data, respectively. The aggregation system 131 may be stored on a single device or a combination of devices of FIG. 1. In some implementations, the aggregation system 131 can be implemented using hardware including a field-programmable gate array ("FPGA") or an application-specific integrated circuit ("ASIC"). In some other implementations, the aggregation system 131 may be implemented using a combination of hardware and software. Example implementations of the aggregation system 131 are described in U.S. application Ser. No. 14/465,575, titled "Aggregating Image Frames and Audio Data to Generate Virtual Reality Content", filed Aug. 21, 2014, which is herein incorporated in its entirety by reference.

In some implementations, the aggregation system 131 may receive image frames that are captured by the camera modules 103 at a particular time and may stitch the image frames to form a left and a right panoramic images associated with the particular time. For example, the aggregation system 131 may determine virtual cameras located between the camera modules 103, generate virtual camera images for the virtual cameras from the image frames that are captured at the particular time, and generate the left and right panoramic images associated with the particular time using the image frames and the virtual camera images. Similarly, the aggregation system 131 may generate other left and right panoramic images associated with other particular times. The aggregation system 131 may generate a stream of 3D video data that includes a stream of left panoramic images for left eye viewing and a stream of right panoramic images for right eye viewing. The aggregation system 131 is described below in more detail with reference to FIGS. 3-7B.

The viewing system 133 may include or use a computing device to decode and render a stream of 3D video data on a VR display device (e.g., Oculus Rift VR display) or other suitable display devices that include, but are not limited to: augmented reality glasses; televisions, smartphones, tablets, or other devices with 3D displays and/or position tracking sensors; and display devices with a viewing position control, etc. The viewing system 133 may also decode and render a stream of 3D audio data on an audio reproduction device (e.g., a headphone or other suitable speaker devices). The viewing system 133 may include the VR display configured to render the 3D video data and the audio reproduction device configured to render the 3D audio data. The viewing system 133 may be coupled to the client device 127 via a signal line 110 and the network 105 via a signal line 112. A user 134 may interact with the viewing system 133.

In some implementations, the viewing system 133 may receive VR content from the client device 127. Alternatively or additionally, the viewing system 133 may receive the VR content from the server 129. The viewing system 133 may also be coupled to the aggregation system 131 and may receive the VR content from the aggregation system 131. The VR content may include one or more of a stream of 3D video data, a stream of 3D audio data, a compressed stream of 3D video data, a compressed stream of 3D audio data, a combined stream of 3D video data and 3D audio data, and other suitable content.

The viewing system 133 may track a head orientation of the user 134. For example, the viewing system 133 may include one or more accelerometers or gyroscopes used to detect a change in the user's head orientation. The viewing system 133 may decode and render the stream of 3D video data on a VR display device and the stream of 3D audio data on a speaker system based on the head orientation of the user 134. As the user 134 changes his or her head orientation, the viewing system 133 may adjust the rendering of the 3D video data and 3D audio data based on the changes of the user's head orientation.

In some implementations, the viewing system 133 includes a peripheral device such as a microphone, camera, mouse, or keyboard that is configured to enable the user 134 to provide an input to one or more components of the system 100. In some implementations, the peripheral device includes a camera such as the Microsoft® Kinect or another similar device, which allows the user 134 to provide gesture inputs to the viewing system 133 or other entities of the system 100.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices may communicate. In some implementations, the network 105 may be a peer-to-peer network. The network 105 may also be coupled to or include portions of a telecommunications network for sending data in a variety of different communication protocols. In some implementations, the network 105 may include Bluetooth communication networks or a cellular communications network for sending and receiving data including via short messaging service (SMS), multimedia messaging service (MMS), hypertext transfer protocol (HTTP), direct data connection, WAP, email, etc.

The server 129 may be a hardware server that includes a processor, a memory, and network communication capabilities. In the illustrated implementation, the server 129 is coupled to the network 105 via a signal line 120. The server 129 sends and receives data to and from one or more of the other entities of system 100 via the network 105. For example, the server 129 receives VR content including a stream of 3D video data (or compressed 3D video data) and a stream of 3D audio data (or compressed 3D audio data) from the client device 127 and stores the VR content on a storage device associated with the server 129. Alternatively, the server 129 includes the aggregation system 131 that receives raw video data and raw audio data from the client device 127 and aggregates the raw video data and raw audio data to generate the VR content. The viewing system 133 may access the VR content from the server 129 or the client device 127.

Figure 2A:
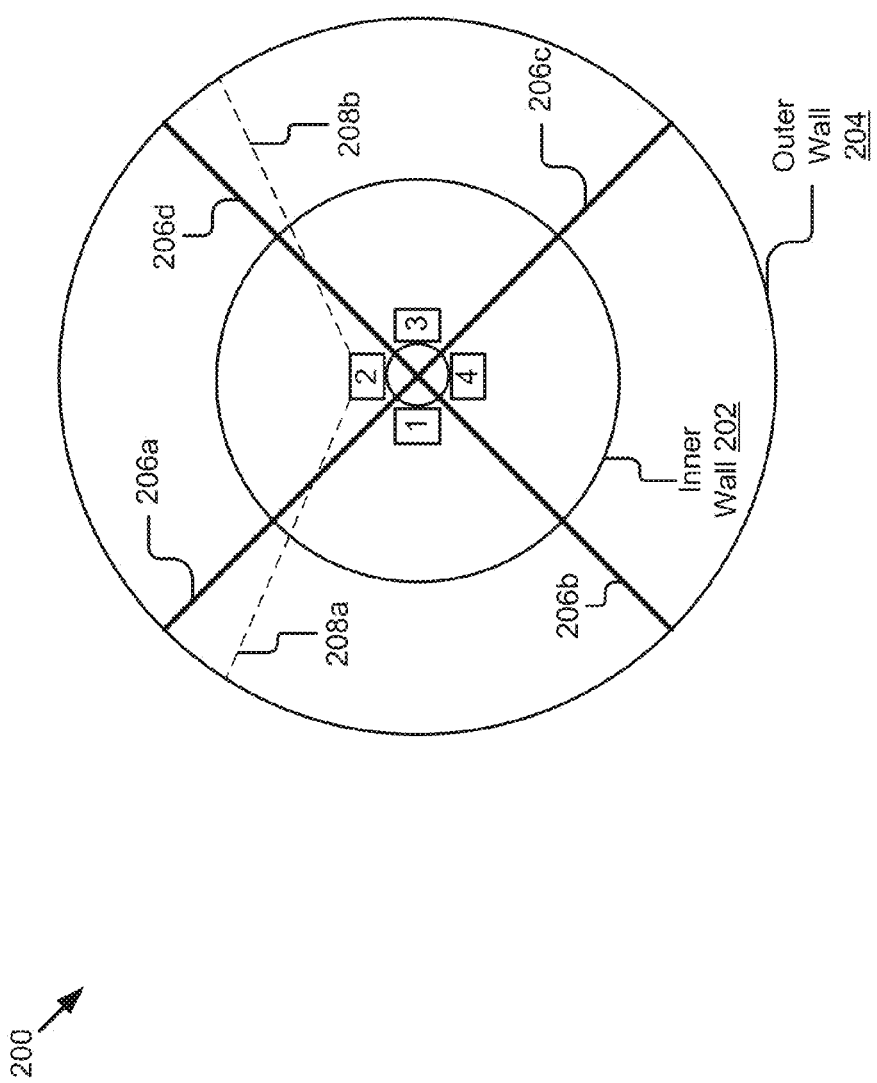
FIGS. 2A-2C are graphic representations that illustrate a relationship between an increasing density of cameras and a reduction of stitching errors according to some implementations.
Figure 2B:
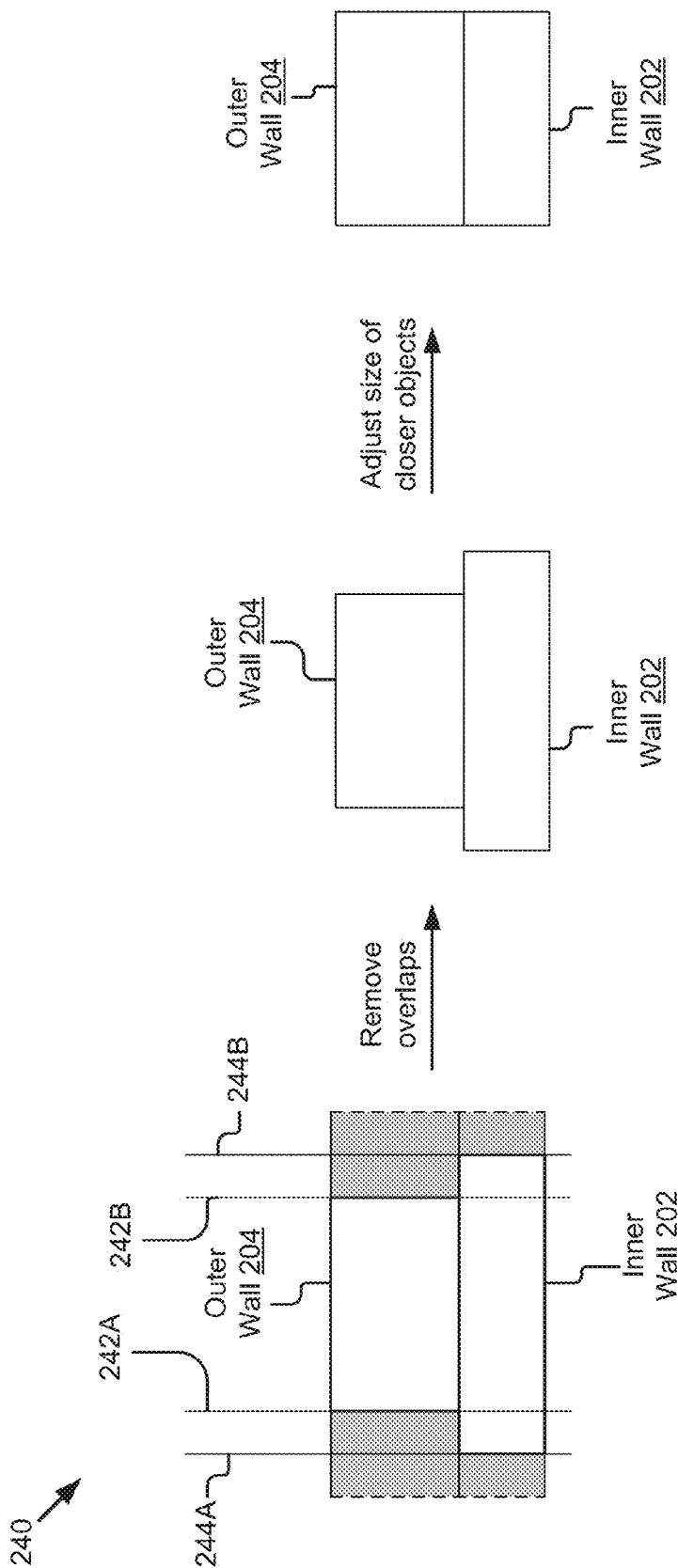
Figure 2C:
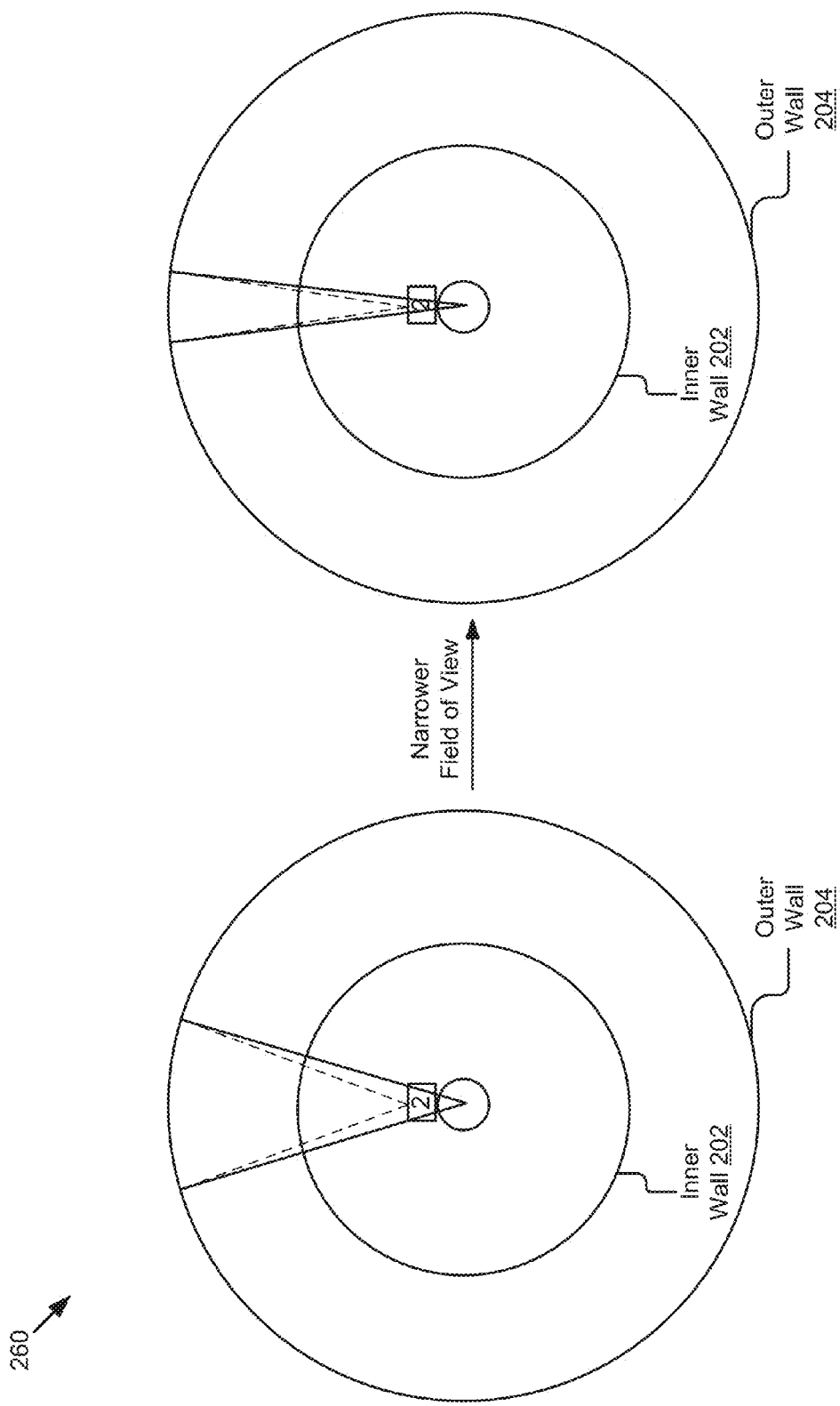

FIGS. 2A-2C are graphic representations 200, 240, and 260 that illustrate a relationship between an increasing density of camera modules 103 and a reduction of stitching errors in panoramic images according to some implementations. Referring to FIG. 2A, four camera modules (e.g., cameras 1, 2, 3, and 4) are located inside two concentric walls, with a circular inner wall 202 closer to the cameras 1, 2, 3, and 4 and shorter than a circular outer wall 204. A panoramic view of the inner wall 202 and the outer wall 204 may be split into four equal quadrants as illustrated using solid lines 206a, 206b, 206c, and 206d since there are four cameras capturing the panoramic view. Each camera may need a wide field of view to capture a corresponding portion of the panoramic view of the inner wall 202. For example, a wide field of view of camera 2 is illustrated using dashed lines 208a and 208b.

Since centers of cameras 1, 2, 3, and 4 are not co-located in the center of the inner wall 202 and the outer wall 204, each camera may have a view of the inner wall 202 that has less overlap between camera quadrants than a view of the outer wall 204. For example, a view of the inner wall 202 and the outer wall 204 from camera 2 is illustrated in a left graph of FIG. 2B, with shaded areas illustrating the overlaps. To stitch images from the different cameras, a boundary of each quadrant image may need to be a straight line. However, there may be no straight line that can eliminate the overlap for both the inner wall 202 and the outer wall 204. For example, straight lines 242A and 242B that eliminate overlap for the outer wall 204 cuts off part of the inner wall 202. Thus, part of the inner wall 202 may disappear in the panorama. Straight lines 244A and 244B that eliminate overlap for the inner wall 202 leave overlap of the outer wall 204 in the panorama. Thus, part of the outer wall 204 may be replicated in the panorama.

After removing the overlaps between camera quadrants, the view of the inner wall 202 and the outer wall 204 is illustrated in a middle graph of FIG. 2B. However, since the inner wall 202 is closer to camera 2 than the outer wall 204, the view of the inner wall 202 is larger in size than the view of the outer wall 204 as illustrated in the middle graph of FIG. 2B. Stitching errors may occur if the views of the inner wall 202 and the outer wall 204 from different cameras are stitched together without adjusting the views of the inner wall 202. In other words, to avoid visually detectable stitching errors, the view of the inner wall 202 may be adjusted to be consistent with the view of the outer wall 204, as illustrated in a right graph of FIG. 2B.

In scenarios where various objects are located in various locations in a scene, it may be a challenge to adjust views of closer objects to fit to views of far-away objects. However, if more cameras are added to capture the scene (e.g., a density of cameras is increased), each camera may use a narrower field of view to capture the scene and viewing angles of each camera for the inner wall 202 and the outer wall 204 may converge. As a result, stitching errors incurred from aggregating images from different cameras may be reduced or eliminated. By way of examples, camera 2 and viewing angles of camera 2 are illustrated in FIG. 2C. If a narrower field of view of camera 2 is used, viewing angles of the inner wall 202 and the outer wall 204 from camera 2 may converge. An example mechanism to increase a camera density in the camera array 101 may include adding virtual cameras to the camera array 101, which is described below in more detail with reference to FIGS. 3-7B.

Figure 3:
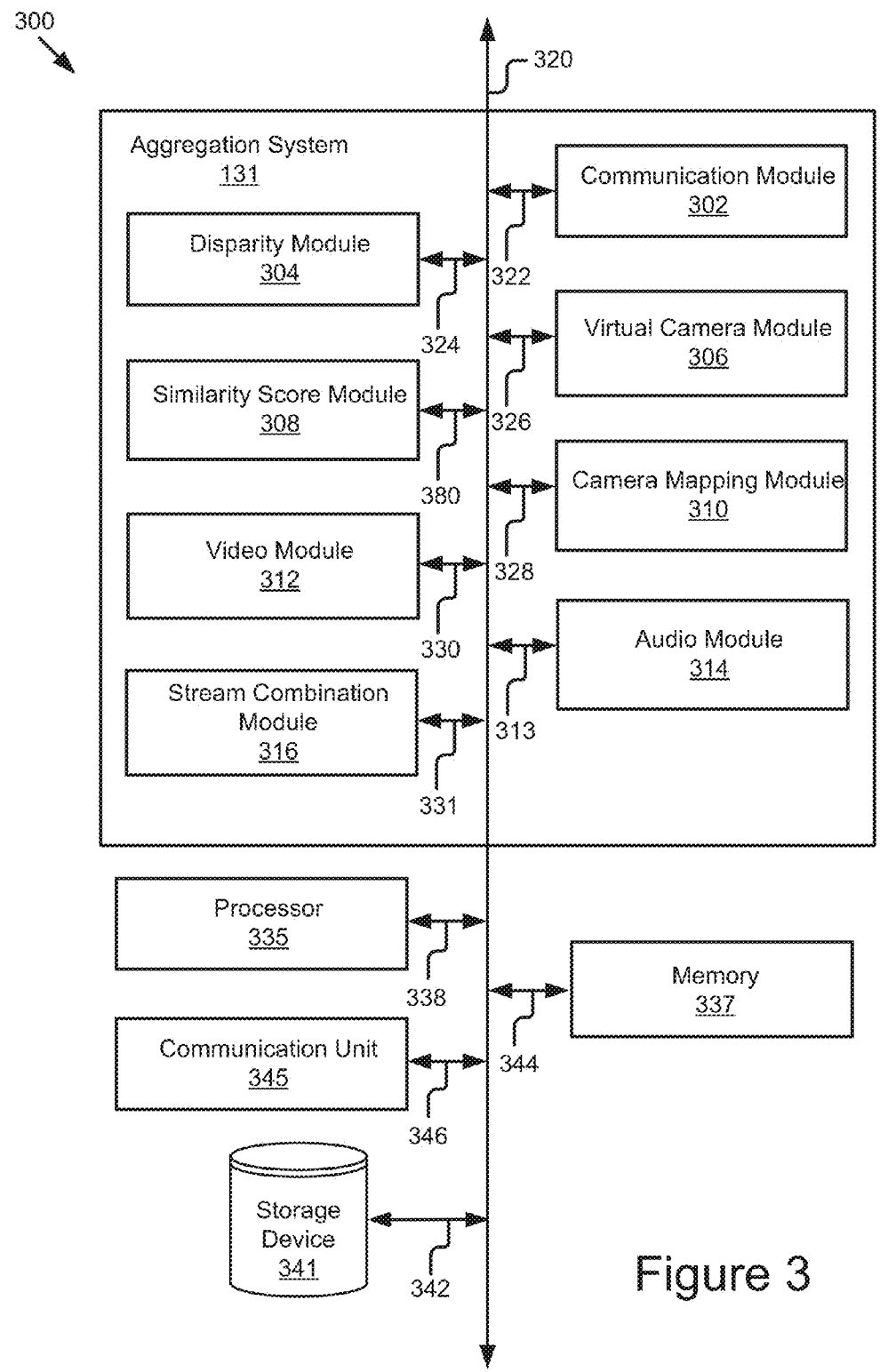
FIG. 3 illustrates a block diagram of some implementations of a computing device that includes an example aggregation system.

Referring now to FIG. 3, an example of the aggregation system 131 is illustrated in accordance with at least some implementations described herein. FIG. 3 is a block diagram of a computing device 300 that includes the aggregation system 131, a memory 337, a processor 335, a storage device 341, and a communication unit 345. In the illustrated implementation, the components of the computing device 300 are communicatively coupled by a bus 320. In some implementations, the computing device 300 may be a personal computer, smart phone, tablet computer, set top box or any other processor-based computing device. The computing device 300 may be one of the client device 127, the server 129, and another device in the system 100 of FIG. 1.

The processor 335 may include an arithmetic logic unit, a microprocessor, a general purpose controller, or some other processor array to perform computations and provide electronic display signals to a display device. The processor 335 is coupled to the bus 320 for communication with the other components via a signal line 338. The processor 335 may process data signals and may include various computing architectures including a complex instruction set computer (CISC) architecture, a reduced instruction set computer (RISC) architecture, or an architecture implementing a combination of instruction sets. Although FIG. 3 includes a single processor 335, multiple processors may be included. Other processors, operating systems, sensors, displays and physical configurations may be possible.

The memory 337 includes a non-transitory memory that stores data for providing the functionality described herein. The memory 337 may be a dynamic random access memory (DRAM) device, a static random access memory (SRAM) device, flash memory or some other memory devices. In some implementations, the memory 337 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. The memory 337 may store the code, routines and data for the aggregation system 131 to provide its functionality. The memory 337 is coupled to the bus 320 via a signal line 344.

The communication unit 345 may transmit data to any of the entities of the system 100 depicted in FIG. 1. Similarly, the communication unit 345 may receive data from any of the entities of the system 100 depicted in FIG. 1. The communication unit 345 may include one or more Ethernet switches for receiving the raw video data and the raw audio data from the connection hub 123. The communication unit 345 is coupled to the bus 320 via a signal line 346. In some implementations, the communication unit 345 includes a port for direct physical connection to a network, such as a network 105 of FIG. 1, or to another communication channel. For example, the communication unit 345 may include a port such as a USB, SD, RJ45, or similar port for wired communication with another computing device. In some implementations, the communication unit 345 includes a wireless transceiver for exchanging data with another computing device or other communication channels using one or more wireless communication methods, including IEEE 802.11, IEEE 802.16, BLUETOOTH® or another suitable wireless communication method.

In some implementations, the communication unit 345 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some implementations, the communication unit 345 includes a wired port and a wireless transceiver. The communication unit 345 also provides other conventional connections to a network for distribution of data using standard network protocols including TCP/IP, HTTP, HTTPS and SMTP, etc.

The storage device 341 may be a non-transitory storage medium that stores data for providing the functionality described herein. The storage device 341 may be a dynamic random access memory (DRAM) device, a static random access memory (SRAM) device, flash memory, or some other memory devices. In some implementations, the storage device 341 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. The storage device 341 is communicatively coupled to the bus 320 via a signal line 342.

In the implementation illustrated in FIG. 3, the aggregation system 131 includes a communication module 302, a disparity module 304, a virtual camera module 306, a similarity score module 308, a camera mapping module 310, a video module 312, an audio module 314, and a stream combination module 316. These modules of the aggregation system 131 are communicatively coupled to each other via the bus 320.

In some implementations, each module of the aggregation system 131 (e.g., module 302, 304, 306, 308, 310, 312, 314, or 316) may include a respective set of instructions executable by the processor 335 to provide its respective functionality described below. In some implementations, each module of the aggregation system 131 may be stored in the memory 337 of the computing device 300 and may be accessible and executable by the processor 335. Each module of the aggregation system 131 may be adapted for cooperation and communication with the processor 335 and other components of the computing device 300.

The communication module 302 may be software including routines for handling communications between the aggregation system 131 and other components of the computing device 300. The communication module 302 may be communicatively coupled to the bus 320 via a signal line 322. The communication module 302 sends and receives data, via the communication unit 345, to and from one or more of the entities of the system 100 depicted in FIG. 1. For example, the communication module 302 may receive raw video data from the connection hub 123 via the communication unit 345 and may forward the raw video data to the video module 312. In another example, the communication module 302 may receive VR content from the stream combination module 316 and may send the VR content to the viewing system 133 via the communication unit 345.

In some implementations, the communication module 302 receives data from components of the aggregation system 131 and stores the data in the memory 337 or the storage device 341. For example, the communication module 302 receives VR content from the stream combination module 316 and stores the VR content in the memory 337 or the storage device 341. In some implementations, the communication module 302 retrieves data from the memory 337 or the storage device 341 and sends the data to one or more appropriate components of the aggregation system 131. Alternatively or additionally, the communication module 302 may also handle communications between components of the aggregation system 131.

The disparity module 304 may be software including routines for estimating disparity maps between two or more camera modules 103. The disparity module 304 may be communicatively coupled to the bus 320 via a signal line 324. In some implementations, the two or more camera modules 103 may be two or more neighboring camera modules 103. Two or more neighboring camera modules 103 may refer to two or more camera modules 103 in the camera array 101 that locate in proximity to each other and have overlapping fields of view. Alternatively, the two or more camera modules 103 may not be neighboring camera modules. The two or more camera modules 103 may have an overlapping field of view. For simplicity and convenience of discussion, estimation of disparity maps is described below with reference to a first neighboring camera module 103 (also referred to as "Camera A") and a second neighboring camera module 103 (also referred to as "Camera B"). The description also applies to estimation of disparity maps between more than two neighboring camera modules 103.

Camera A and Camera B may have an overlapping field of view. Objects within this overlapping field of view may be visible to both cameras, and appearance of these objects in image frames captured by the cameras may be determined based on the point of view of the corresponding camera. For example, Camera A may capture a first image for a scene and Camera B may capture a second image for the scene at a particular time. The first image may have a first sub-image that overlaps with a second sub-image from the second image in the overlapping field of view. The first sub-image may represent a portion of the first image that overlaps with Camera B's field of view in an area of the overlapping field of view. The second sub-image may represent a portion of the second image that overlaps with Camera A's field of view in the area of the overlapping field of view. For convenience of discussion, the first sub-image may be referred to as "Image AB" and the second sub-image may be referred to as "Image BA." Image AB and Image BA overlap with each other in the overlapping field of view of Camera A and Camera B.

Figure 10:
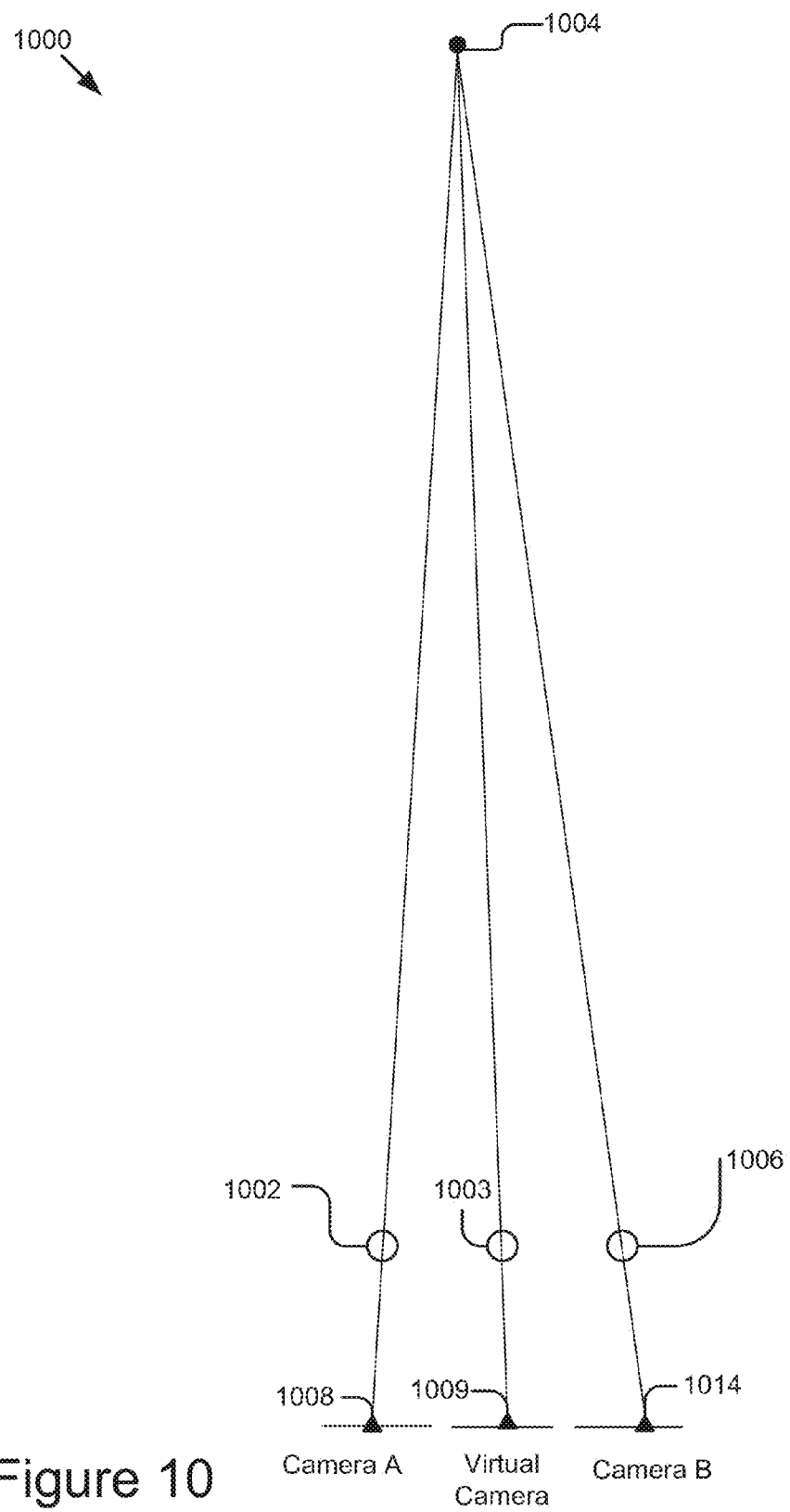
FIG. 10 is a graphic representation that illustrates example disparity along an epipolar line according to some implementations.

If image planes of Camera A and Camera B are not coplanar, a transformation such as image rotation may be applied to create coplanar images. If the image planes of the Camera A and Camera B are coplanar and projection centers of the two cameras are closer to each other compared to objects in the scene, the appearances of objects in the first and second images may differ primarily in their displacement along an epipolar line that connects the projection centers of the two cameras. The different appearances of the objects in the first and second images may be referred to as parallax, and the difference in the object positions in the first and second images may be referred to as disparity. An illustration of disparity is illustrated in FIG. 10.

A disparity map may represent a two-dimensional (2D) map that specifies disparity within an overlapping field of view between two cameras at a level of individual pixels. For example, a first disparity map from Camera A to Camera B may map disparity of pixels from Image AB to Image BA and may be referred to as Disparity(AB→BA). A second disparity map from Camera B to Camera A may map disparity of pixels from Image BA to Image AB and may be referred to as Disparity(BA→AB). The first disparity map "Disparity(AB→BA)" and the second disparity map "Disparity(BA→AB)" may be substantially symmetric and may differ at points of occlusion. Points of occlusion may refer to pixels that are visible to one camera and invisible to another camera because view from the other camera may be blocked by other objects.

For example, assume that Camera A is horizontally displaced to the left of Camera B so that all epipolar lines are horizontal, or along an x-axis. Both Image AB and Image BA have a size of 100 pixels×100 pixels, respectively. The first disparity map "Disparity(AB→BA)" and the second disparity map "Disparity(BA→AB)" may each have a size of 100×100 since each of the first and second disparity maps covers the entire overlapping field of view. Assume that a map entry at a position (8,4) in the first disparity map "Disparity(AB→BA)" has a disparity value of "−5," which means that a pixel of Image AB at the position (8,4) corresponds to a pixel of Image BA at a position (3,4) (e.g., the x coordinate value 3=8−5). The disparity value "−5" may represent a disparity of "5" in a direction opposite to an epipolar direction along an epipolar line that connects a projection center of Camera A to a projection center of Camera B. Symmetrically, a map entry at the position (3,4) of the second disparity map "Disparity(BA→AB)" may have a disparity value of "5," which means that the pixel of Image BA at the position (3,4) corresponds to the pixel of Image A at the position (8,4) (e.g., the x coordinate value 8=3+5). The disparity value "5" may represent a disparity of "5" in the epipolar direction along the epipolar line.

As a result, given Image AB and the first disparity map "Disparity(AB→BA)," an estimate of Image BA may be determined except at points that are visible to Camera B and invisible to Camera A. Similarly, given Image BA and the second disparity map "Disparity(BA→AB)," an estimate of Image AB may be determined except at points that are visible to Camera A and invisible to Camera B.

The disparity module 304 may estimate the first disparity map "Disparity(AB→BA)" by comparing pixels of Image AB and pixels of Image BA. If exposure, gain, white balance, focus, and other properties of Camera A and Camera B are not identical, Image AB and Image BA may be adjusted to match the brightness, color, and sharpness between the two images. For a pixel (x,y) in Image AB, a set of disparity values are selected and a set of similarity scores corresponding to the set of disparity values for the pixel (x,y) is determined by the similarity score module 308 as described below in more detail. A map entry at the position (x,y) of the first disparity map "Disparity(AB→BA)" may have a value equal to a disparity value that has a highest similarity score from the set of similarity scores. An example method of estimating a disparity map is described with reference to FIGS. 6A and 6B.

For example, assume Image AB and Image BA have horizontal disparity. For a pixel (3,5) of Image AB, a first disparity value "0" is selected. Thus, a pixel (3,5) of Image BA is compared to the pixel (3,5) of Image AB to determine a first similarity score, since the pixel (3,5) of Image BA has a "0" disparity to the pixel (3,5) of Image AB. Next, a second disparity value "−1" is selected and a pixel (2,5) of Image BA is compared to the pixel (3,5) of Image AB to determine a second similarity score, since the pixel (3,5) of Image AB has a "−1" disparity to the pixel (2,5) of Image BA. Similarly, other disparity values may be selected and corresponding similarity scores may be determined for the pixel (3,5) of Image AB. A map entry at the position (3,5) of the first disparity map "Disparity(AB→BA)" may be configured to have a disparity value that corresponds to the highest similarity score from the determined similarity scores.

A disparity value may include an integer value (e.g., 0, −1, 1, −2, 2, . . . ) or a non-integer value. Non-integer disparity values may be used to determine similarity scores using pixel interpolation. A maximum absolute value for the disparity value may be determined based on how close the objects in the scene are expected to get to the cameras.

Similarly, the disparity module 304 may estimate the second disparity map "Disparity(BA→AB)" by performing operations similar to those described above. Alternatively, the disparity module 304 may estimate the second disparity map "Disparity(BA→AB)" from the first disparity map "Disparity(AB→BA)." For example, if a map entry at a position (x,y) of the first disparity map has a disparity value of "d," a map entry at a position (x+d,y) of the second disparity map has a disparity value of "−d."

In some implementations, one or more pixels in Image AB may not have corresponding pixels in Image BA and vice versa, since foreground objects may occlude background objects in the scene. The disparity module 304 may detect pixel occlusion by configuring a similarity score threshold. For example, if a highest similarity score for a pixel is below the similarity score threshold, a map entry that corresponds to the pixel in a disparity map may be configured to be blank to indicate a pixel occlusion.

In some implementations, the disparity module 304 may detect disparity collisions. Since each pixel's disparity may be determined independently, collisions may occur in the disparity map. A collision may indicate that two or more pixels in a first image may map to a common pixel in a second image, and the two or more pixels may be referred to as collision pixels. The disparity module 304 may select a collision pixel with a higher similarity score from the collision pixels, and may configure a corresponding map entry in the disparity map that maps the collision pixel with the higher similarity score to the common pixel in the second image. For other collision pixels with lower similarity scores, the disparity module 304 may leave associated map entries blank in the disparity map to indicate pixel occlusion.

For example, during computation of the first disparity map "Disparity(AB→BA)," both pixels (10,13) and (7,13) in Image AB may correspond to a common pixel (6,13) in Image BA with disparity values of "−4" and "−1" and similarity scores of "10" and "8," respectively. In this example, a disparity collision occurs for the pixels (10,13) and (7,13) in Image AB. The disparity module 304 may configure a map entry at the position (10,13) with a disparity value "−4" and a map entry at the position (7,13) to be blank to indicate pixel occlusion, since the pixel (10,13) has a higher similarity score than the pixel (7,13).

In some implementations, the disparity module 304 may estimate a disparity value for an occluded pixel. For example, the disparity module 304 may determine two non-occluded pixels along the epipolar line that are closest to the occluded pixel, with the two non-occluded pixels each on one side of the occluded pixel. The two non-occluded pixels may have two disparity values, respectively. The disparity module 304 may select a smaller disparity value from the two disparity value as a disparity value for the occluded pixel. For example, assume that a disparity map along the epipolar line includes map entries with disparity values "2," "3," "4," "occluded," "occluded," "7," "7," "8," respectively. The disparity module 304 may estimate the disparity values for the map entries to be "2," "3," "4," "4," "4," "7," "7," "8," respectively, where the occluded map entries may be estimated to have disparity values of "4" and "4."

Alternatively, the disparity module 304 may model a trend of disparity to capture trending features such as a wall slanting toward the camera. For example, assume that a disparity map along the epipolar line includes map entries with disparity values "1," "2," "3," "occluded," "occluded," "9," "9," "10," respectively. The disparity module 304 may estimate the disparity values for the map entries to be "1," "2," "3," "4," "5," "9," "9," "10," respectively. In this example, the disparity values "1," "2," and "3," may indicate an increasing trend and the occluded map entries may be estimated to have disparity values "4" and "5" following the increasing trend.

In some implementations, more than two cameras may overlap in the same overlapping field of view, and disparity information from different cameras may be combined to improve the disparity estimation. For example, assume projection centers of a first camera, a second camera, and a third camera are located along a horizontal epipolar line. The first camera and the second camera may form a first pair of a left-eye viewing and a right-eye viewing to observe objects in the scene. The second camera and the third camera may form a second pair of the left-eye viewing and the right-eye viewing to observe objects in the scene. If the projection centers of three cameras are spaced at equal distances along the horizontal epipolar line, ideally both the first pair and the second pair may have the same disparity measurement for the same object in the scene. However, since disparity measurements may have noise, a first disparity measurement of the first pair may be different from a second disparity measurement of the second pair. The first disparity measurement and the second disparity measurement may be used to check for agreement and may be combined to generate a disparity measurement to improve measurement accuracy. In some implementations, the disparity map may be noisy, and the disparity module 304 may apply edge-preserving filters such as median filters to smooth the disparity map.

The virtual camera module 306 may be software including routines for determining virtual cameras and virtual camera images for the virtual cameras. The virtual camera module 306 may be coupled to the bus 320 via a signal line 326. In some implementations, the virtual camera module 306 may interpolate one or more virtual cameras between neighboring camera modules 103 in the camera array 101. For example, the virtual camera module 306 may interpolate one or more virtual cameras between Camera A and Camera B and may determine one or more positions for the one or more virtual cameras relative to positions of Camera A and Camera B. The virtual camera module 306 may also interpolate other virtual cameras between other neighboring camera modules 103 in the camera array 101.

For each virtual camera between Camera A and Camera B, the virtual camera module 306 may estimate a virtual camera image based on the first disparity map "Disparity (AB→BA)," the second disparity map "Disparity (BA→AB)," and a position of the virtual camera relative to positions of Camera A and Camera B. A position of the virtual camera relative to positions of Camera A and Camera B may be determined by a scalar $\alpha$ with a value between 0 and 1, where $\alpha=0$ indicates that the virtual camera co-locates with Camera A and $\alpha=1$ indicates that the virtual camera co-locates with Camera B. The virtual camera image for the virtual camera may be estimated from Image AB of Camera A and Image BA of Camera B.

For example, the virtual camera module 306 may scale disparity values stored in map entries of the first disparity map "Disparity(AB→BA)" by the scalar $\alpha$, and may shift respective pixels in Image AB by the respective scaled disparity values to generate a first shifted image from Image AB. The virtual camera module 306 may scale disparity values stored in map entries of the second disparity map "Disparity(BA→AB)" by a scalar 1−α, and may shift respective pixels in Image BA by the respective scaled disparity values to generate a second shifted image from Image BA. The virtual camera module 306 may combine the first shifted image and the second shifted image to generate the virtual camera image for the virtual camera. For example, for each pixel defined in both the first shifted image and the second shifted image, the virtual camera module 306 may make an average over or take a maximum value from the corresponding pixel values of the two shifted images. The virtual camera module 306 may use a linear or non-linear filter and temporal information from previous or future image frames to fill in missing pixels in the virtual camera image. An example non-linear filter includes a median filter. An example method of estimating a virtual camera image for a virtual camera is described below with reference to FIGS. 5A and 5B.

The similarity score module 308 may be software including routines for determining similarity scores between a first pixel in a first image (e.g., Image AB) and second pixels in a second image (e.g., Image BA). The second pixels in the second image may have different disparities to the first pixel in the first image. The similarity score module 308 may be coupled to the bus 320 via a signal line 380.

For a particular disparity value, the similarity score module 308 generates metric values for pixels of Image AB along the epipolar line. A metric value may include one of a sum of absolute difference (SAD), a sum of squared difference (SSD), a correlation-based value, or other suitable metrics. The metric value may be determined across all red, green, blue (RGB) color channels or in some other color space such as YUV, luminance, etc. For example, two pixels (1,5) and (2,5) of Image AB are along the epipolar line. For a disparity value "3," the similarity score module 308 determines: (1) a first metric value for the pixel (1,5) of Image AB by comparing the pixel (1,5) of Image AB to a pixel (4,5) of Image BA; and (2) a second metric value for the pixel (2,5) of Image AB by comparing the pixel (2,5) of Image AB to a pixel (5,5) of Image BA. For a disparity value "4," the similarity score module 308 determines: (1) a first metric value for the pixel (1,5) of Image AB by comparing the pixel (1,5) of Image AB to a pixel (5,5) of Image BA; and (2) a second metric value for the pixel (2,5) of Image AB by comparing the pixel (2,5) of Image AB to a pixel (6,5) of Image BA.

A metric value may also be referred to as a distance metric score. The metric value may measure how similar two pixels are by calculating a distance between the two pixels. A zero-value metric value may indicate that the two pixels are identical with a zero distance. A larger metric value may represent more dissimilarity between two pixels than a smaller metric value.

In some implementations, the similarity score module 308 may initially filter or process Image AB and Image BA to reduce noise that may affect the pixel matching measurements. The similarity score module 308 may perform a search along a direction that is perpendicular to the epipolar line for pixels with a better match to counteract slight misalignments in the direction perpendicular to the epipolar line.

The similarity score module 308 may determine a metric threshold that may be used to define runs of adjacent pixels along the epipolar line. A run may include a contiguous group of pixels with metric values below the determined metric threshold. The similarity score module 308 may determine runs for pixels along the epipolar line based on metric values associated with the pixels and the metric threshold. For example, a particular pixel along the epipolar line that participates in a run calculation may have a run value equal to the calculated run. The similarity score module 308 may determine preliminary scores for pixels along the epipolar line based on runs of the pixels and the metric threshold. For example, a preliminary score for each pixel along the epipolar line may be equal to the run of the corresponding pixel divided by the metric threshold. Next, the similarity score module 308 may vary the metric threshold and determine different preliminary scores for the pixels along the epipolar line for the different metric thresholds. The metric threshold may be varied in a range between zero and a maximum threshold. The maximum threshold may be determined based on how much difference a user may visually tolerate before determining two images are images with different objects. If a metric value exceeds the maximum threshold, the two images used to calculate the metric value may not be treated as images capturing the same object. The similarity score module 308 may determine a similarity score for a pixel along the epipolar line as a highest preliminary score of the pixel. A similarity score may indicate a degree of similarity between two pixels. A higher similarity score for two pixels may indicate more similarity between the two pixels than a smaller similarity score. A method of determining similarity scores is described below with reference to FIGS. 7A and 7B.

For example, SAD metric values for pixels along the epipolar line for a particular disparity value may include: 3, 4, 2, 3, 1, 6, 8, 3, 1. If the similarity score module 306 determines a metric threshold to be 5, runs of adjacent pixels that are not above the metric threshold may include: 5, 0, 2, where the first five metric values "3, 4, 2, 3, 1" are below the metric threshold and thus a run of "5" is generated, the next two metric values "6, 8" are above the metric threshold and thus a run of "0" is generated, and the last two metric values "3, 1" are below the metric threshold and thus a run of "2" is generated. Thus, the first five pixels with metric values "3, 4, 2, 3, 1" may each have a run of "5," the next two pixels with metric values "6, 8" may each have a run of "0," and the last two pixels with metric values of "3, 1" may each have a run of "2." As a result, runs for the pixels along the epipolar line include: 5, 5, 5, 5, 5, 0, 0, 2, 2. Preliminary scores for the pixels along the epipolar line may be equal to the corresponding runs divided by the metric threshold "5" and may include: 1, 1, 1, 1, 1, 0, 0, 2/5, 2/5. Next, the metric threshold may be modified to be 6. Runs for the pixels may include: 6, 6, 6, 6, 6, 6, 0, 0, 2, 2. Another set of preliminary scores for the pixels along the epipolar line for the metric threshold "6" may include: 1, 1, 1, 1, 1, 1, 0, 2/6, 2/6. The similarity score module 308 may select different metric thresholds and determine different preliminary scores associated with the different metric thresholds for the pixels. The similarity score module 308 may determine a similarity score for a particular pixel along the epipolar line as a highest preliminary score of the particular pixel.

More generally, the mechanisms described herein to estimate disparity maps and to determine similarity scores are provided by way of example. There may be numerous other ways to estimate the disparity maps and the similarity scores.

The camera mapping module 310 may be software including routines for constructing a left camera map and a right camera map. The camera mapping module 310 may be adapted for cooperation and communication with the processor 335 and other components of the computing device 300 via a signal line 328.

A camera map may include a left camera map or a right camera map. A camera map may use (yaw, pitch) as an input and may generate an output of (an identifier of a matching camera, x, y), indicating a pixel (yaw, pitch) in a panoramic image may be obtained as a pixel (x, y) in an image plane of the identified matching camera. The camera map may store the output (an identifier of a matching camera, x, y) in a map entry related to the input (yaw, pitch). Pixels in an image plane of a camera module may be determined by using a camera model (e.g., a pinhole camera model or more complex lens model) to map points in 3D space onto pixels in the image plane of the camera module, where the points in the 3D space are assumed to be at a particular distance from the camera module.

A two-dimensional (2D) spherical panoramic image may be used to represent a panorama of a scene. As described below with reference to the video module 312, two stereoscopic panorama images may be generated for two eyes to provide a stereoscopic view of the entire scene. For example, a left panoramic image may be generated for the left eye viewing and a right panoramic image may be generated for the right eye viewing. An example panoramic image is illustrated in FIG. 8B.

A pixel in a panoramic image may be presented by a yaw value and a pitch value. Yaw represents rotation around the center and may be represented on the horizontal x-axis as:

$$yaw=360°\times x/width. \quad (1)$$

Yaw has a value between 0° and 360°. Pitch represents up or down rotation and may be represented on the vertical y-axis as:

$$pitch=90°\times(height/2-y)/(height/2). \quad (2)$$

Pitch has a value between −90° and 90°.

The panoramic images may give a sense of real depth by exploiting a human brain's capacity to transform disparity (e.g., shifts in pixel positions) into depth. For example, a nearby object may have a larger disparity than a far-away object. Disparity may represent pixel shifts in positions between two images. Disparity may be caused by an interocular distance which represents a distance between two eyes. Each eye may receive a slightly different image, which creates a sense of depth.

In a panoramic image described herein (the left or right panoramic image), each pixel in the panoramic image may represent a view into a slightly different direction. For example, a pixel at an x position with pitch=0° in a left panoramic image may represent an eye viewing position of the left eye as the head is rotated by the yaw indicated by the x position. Similarly, a pixel at an x position with pitch=0° in a right panoramic image represents an eye viewing position of the right eye as the head is rotated by the yaw indicated by the x position. For pitch=0° (e.g., no up and down rotations), as the head is rotated from x=0 to x=width, a blended panorama for eye viewing positions with all 360-degree head rotations in the horizontal axis may be produced.

In some implementations, an interocular distance may be adjusted based on the pitch value. For example, if pitch≠0°, the interocular distance associated with the pitch may be adjusted as:

$$interocular\ distance=max(interocular\ distance)\times\cos(pitch), \quad (3)$$

where max(interocular distance) represents the maximum value of the interocular distance (e.g., the interocular distance is at its maximum when pitch=0°). In some examples, the maximum value of the interocular distance may be about 60 millimeters. In other examples, the maximum value of the interocular distance may have a value greater than 60 millimeters or less than 60 millimeters.

The camera mapping module 310 may construct a left camera map that identifies a respective matching camera for each pixel in a left panoramic image. For example, for a pixel in a left panoramic image that represents a point in a panorama, the left camera map may identify a matching camera module 103 or a matching virtual camera that has a better view for the point in the panorama than other camera modules 103 and other virtual cameras. A matching camera may include a matching camera module 103 (e.g., a real camera) or a matching virtual camera. Thus, the left camera map may map pixels in a left panoramic image to matching cameras that have better views for the corresponding pixels. Determination of a matching camera for a pixel is described below in more detail. An example camera map is illustrated with reference to FIG. 8C.

For a pixel in a left panoramic image that represents a point in a panorama, the camera mapping module 310 may determine a yaw, a pitch, and an interocular distance using the above mathematical expressions (1), (2), and (3), respectively. The camera mapping module 310 may use the yaw and pitch to construct a vector representing a viewing direction of the left eye (e.g., a left viewing direction) to the point in the panorama.

In some implementations, a matching camera for a pixel in a left panoramic image has a viewing direction to a point that corresponds to the pixel. The viewing direction of the matching camera is closer to the left viewing direction than other viewing directions of other camera modules 103 and virtual cameras to the same point in the panorama. For example, the viewing direction of the matching camera is more parallel to the left viewing direction than other viewing directions of other camera modules 103 and virtual cameras. Illustrations of a matching camera are illustrated with reference to FIGS. 9A-9C.

Similarly, the camera mapping module 310 may construct a right camera map that identifies a corresponding matching camera for each pixel in a right panoramic image. For example, for a pixel in a right panoramic image that represents a point in a panorama, the right camera map may identify a matching camera that has a better view for the point in the panorama than other camera modules 103 and other virtual cameras. Thus, the right camera map may map pixels in a right panoramic image to matching cameras that have better views for the corresponding pixels.

In some implementations, the left and right camera maps may be pre-computed and stored to achieve a faster processing speed compared to an on-the-fly computation.

The video module 312 may be software including routines for generating a stream of 3D video data configured to render 3D video when played back on a VR display device. The video module 312 may be adapted for cooperation and communication with the processor 335 and other components of the computing device 300 via a signal line 330. The stream of 3D video data may describe a stereoscopic panorama of a scene that may vary over time. The stream of 3D video data may include a stream of left panoramic images for left eye viewing and a stream of right panoramic images for right eye viewing.

In some implementations, the video module 312 receives raw video data describing image frames from the various camera modules 103 in the camera array 101. The video module 312 identifies a location and timing associated with each of the camera modules 103 and synchronizes the image frames based on locations and timings of the camera modules 103. The video module 312 synchronizes corresponding images frames that are captured by different camera modules 103 at the same time. In some implementations, the video module 312 or another module in the aggregation system 131 may correct calibration errors in the synchronized image frames.

The video module 312 may receive a left camera map and a right camera map from the camera mapping module 310. Alternatively, the video module 312 may retrieve the left and right camera maps from the storage device 341 or the memory 337. The video module 312 may construct a stream of left panoramic images from the image frames captured by the camera modules 103 and virtual camera images of virtual cameras based on the left camera map. For example, the video module 312 identifies matching cameras from the left camera map. The matching cameras may include matching camera modules 103 and matching virtual cameras. The video module 312 constructs a first left panoramic image $PI_{L,0}$ associated with a first particular time $T=T_0$ by stitching together: (1) image frames that are captured by the matching camera modules 103 at the first particular time $T=T_0$; and (2) virtual camera images of the matching virtual cameras associated with the first particular time $T=T_0$. The video module 312 constructs a second left panoramic image $PI_{L,1}$ associated with a second particular time $T=T_1$ by stitching: (1) image frames captured by the matching camera modules 103 at the second particular time $T=T_1$; and (2) virtual camera images of the matching virtual cameras associated with the second particular time $T=T_1$, and so on and so forth. The video module 312 constructs the stream of left panoramic images to include the first left panoramic image $PI_{L,0}$ associated with the first particular time $T=T_0$, the second left panoramic image $PI_{L,1}$ associated with the second particular time $T=T_1$, and other left panoramic images.

Specifically, for a pixel in a left panoramic image $PI_{L,i}$ associated with a particular time $T=T_i$ ($i=0, 1, 2, \ldots$), the video module 312: (1) identifies a matching camera from the left camera map (the matching camera including a matching camera module 103 or a matching virtual camera); and (2) configures the pixel in the left panoramic image $PI_{L,i}$ to be a corresponding pixel from an image of the matching camera associated with the particular time $T=T_i$ (e.g., the image being an image frame captured by the matching camera module 103 at the particular time $T=T_i$ or a virtual camera image of the matching virtual camera associated with the particular time $T=T_i$). The pixel in the left panoramic image $PI_{L,i}$ and the corresponding pixel in the image of the matching camera may correspond to the same point in the panorama. For example, for a pixel location in the left panoramic image $PI_{L,i}$ that corresponds to a point in the panorama, the video module 312: (1) retrieves a pixel that also corresponds to the same point in the panorama from the image of the matching camera associated with the particular time $T=T_i$; and (2) places the pixel from the image of the matching camera into the pixel location of the left panoramic image $PI_{L,i}$.

Similarly, the video module 312 constructs a stream of right panoramic images from the image frames captured by the camera modules 103 and virtual camera images of virtual cameras based on the right camera map by performing operations similar to those described above with reference to the construction of the stream of left panoramic images. The description will not be repeated here.

The audio module 314 may be software including routines for generating a stream of 3D audio data configured to render 3D audio when played back on an audio reproduction device. The audio module 314 is communicatively coupled to the bus 320 via a signal line 313. The audio module 314 may generate the 3D audio data based on the raw audio data received from the microphone array 107. In some implementations, the audio module 314 may process the raw audio data to generate four-channel ambisonic audio tracks corresponding to the 3D video data generated by the video module 312. The four-channel ambisonic audio tracks may provide a compelling 3D 360-degree audio experience to the user 134.

In some implementations, the four-channel audio tracks may be recorded in an "A" format by the microphone array 107 such as a Tetramic microphone. The audio module 314 may transform the "A" format four-channel audio tracks to a "B" format that includes four signals: W, X, Y, and Z. The W signal may represent a pressure signal that corresponds to an omnidirectional microphone, and the X, Y, Z signals may correspond to directional sounds in front-back, left-right, and up-down directions, respectively. In some implementations, the "B" format signals may be played back in a number of modes including, but not limited to, mono, stereo, binaural, surround sound including 4 or more speakers, and any other modes. In some examples, an audio reproduction device may include a pair of headphones, and the binaural playback mode may be used for the sound playback in the pair of headphones. The audio module 314 may convolve the "B" format channels with Head Related Transfer Functions (HRTFs) to produce binaural audio with a compelling 3D listening experience for the user 134.

In some implementations, the audio module 314 generates 3D audio data that is configured to provide sound localization to be consistent with the user's head rotation. For example, the raw audio data is encoded with the directionality data that describes the directionality of the recorded sounds. The audio module 314 may analyze the directionality data to produce 3D audio data that changes the sound reproduced during playback based on the rotation of the user's head orientation.

The stream combination module 316 may be software including routines for combining a stream of 3D video data and a stream of 3D audio data to generate VR content. The stream combination module 316 is communicatively coupled to the bus 320 via a signal line 331. The stream of 3D video data includes a stream of left panoramic images for left eye viewing and a stream of right panoramic images for right eye viewing.

The stream combination module 316 may compress the stream of left panoramic images and the stream of right panoramic images to generate a stream of compressed 3D video data using video compression techniques. In some implementations, within each stream of the left or right panoramic images, the stream combination module 316 may use redundant information from one frame to a next frame to reduce the size of the corresponding stream. For example, with reference to a first image frame (e.g., a reference frame), redundant information in the next image frames may be removed to reduce the size of the next image frames. This compression may be referred to as temporal or inter-frame compression within the same stream of left or right panoramic images.

Alternatively or additionally, the stream combination module 316 may use one stream (either the stream of left panoramic images or the stream of right panoramic images) as a reference stream and may compress the other stream based on the reference stream. This compression may be referred to as inter-stream compression. For example, the stream combination module 316 may use each left panoramic image as a reference frame for a corresponding right panoramic image and may compress the corresponding right panoramic image based on the referenced left panoramic image.

In some implementations, the stream combination module 316 may encode the stream of 3D video data (or, compressed 3D video data) and 3D audio data to form a stream of VR content. For example, the stream combination module 316 may compress the stream of 3D video data using h.264 and the stream of 3D audio data using advanced audio coding (AAC) to form a stream of VR content. In another example, the stream combination module 316 may compress the stream of 3D video data and the stream of 3D audio data using a standard MPEG format to form a stream of VR content.

In some implementations, the VR content may be packaged in a container format such as MP4, WebM, VP8, and any other suitable format. The VR content may be stored as a file on the client device 127 or the server 129 and may be streamed to the viewing system 133 for the user 134 from the client device 127 or the server 129. Alternatively, the VR content may be stored on a digital versatile disc (DVD), a flash memory, or another type of storage devices.

Figure 4A:
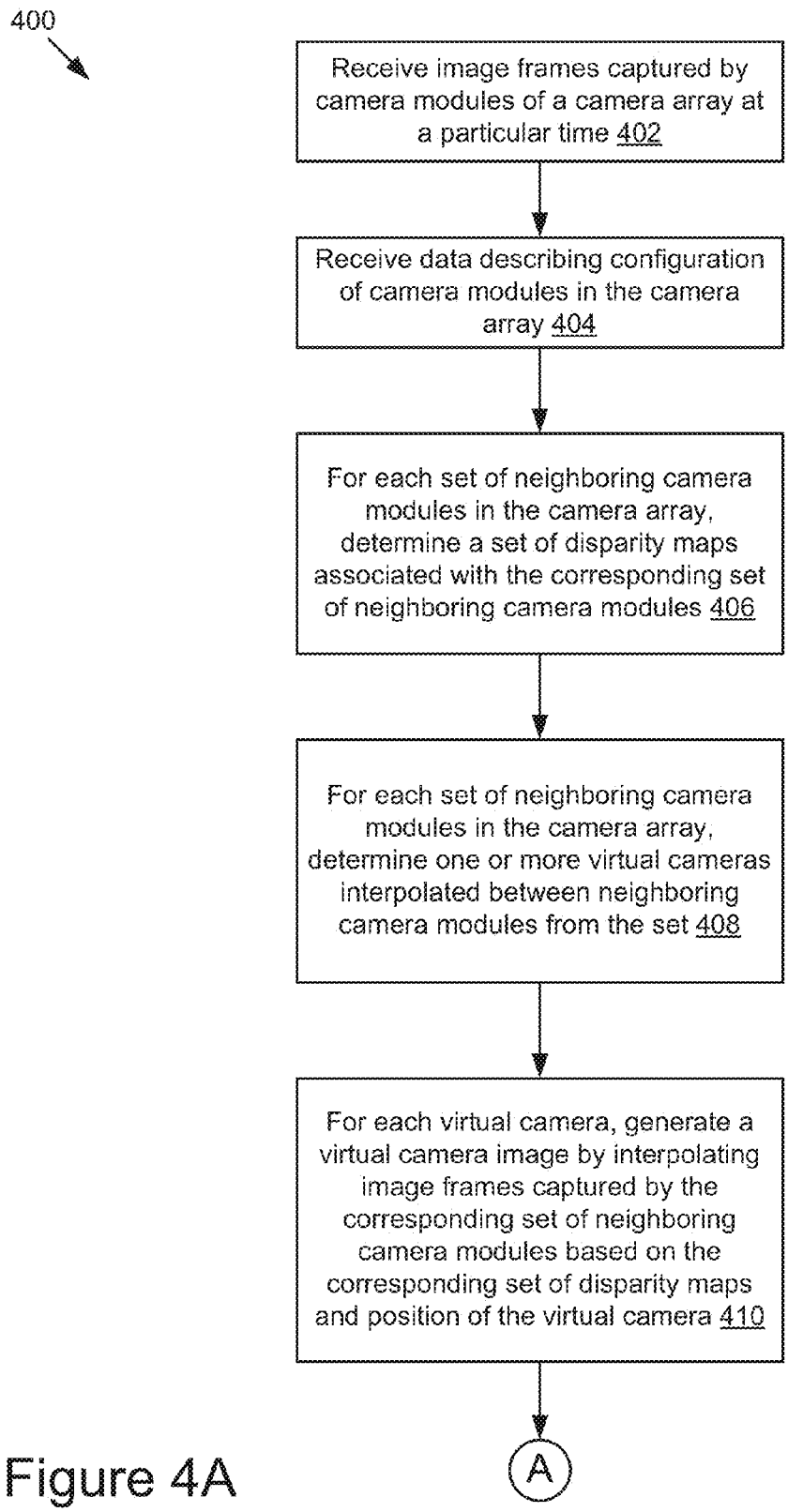
FIGS. 4A and 4B illustrate an example method for stitching image frames captured at a particular time to generate a left and a right panoramic images according to some implementations.
Figure 4B:
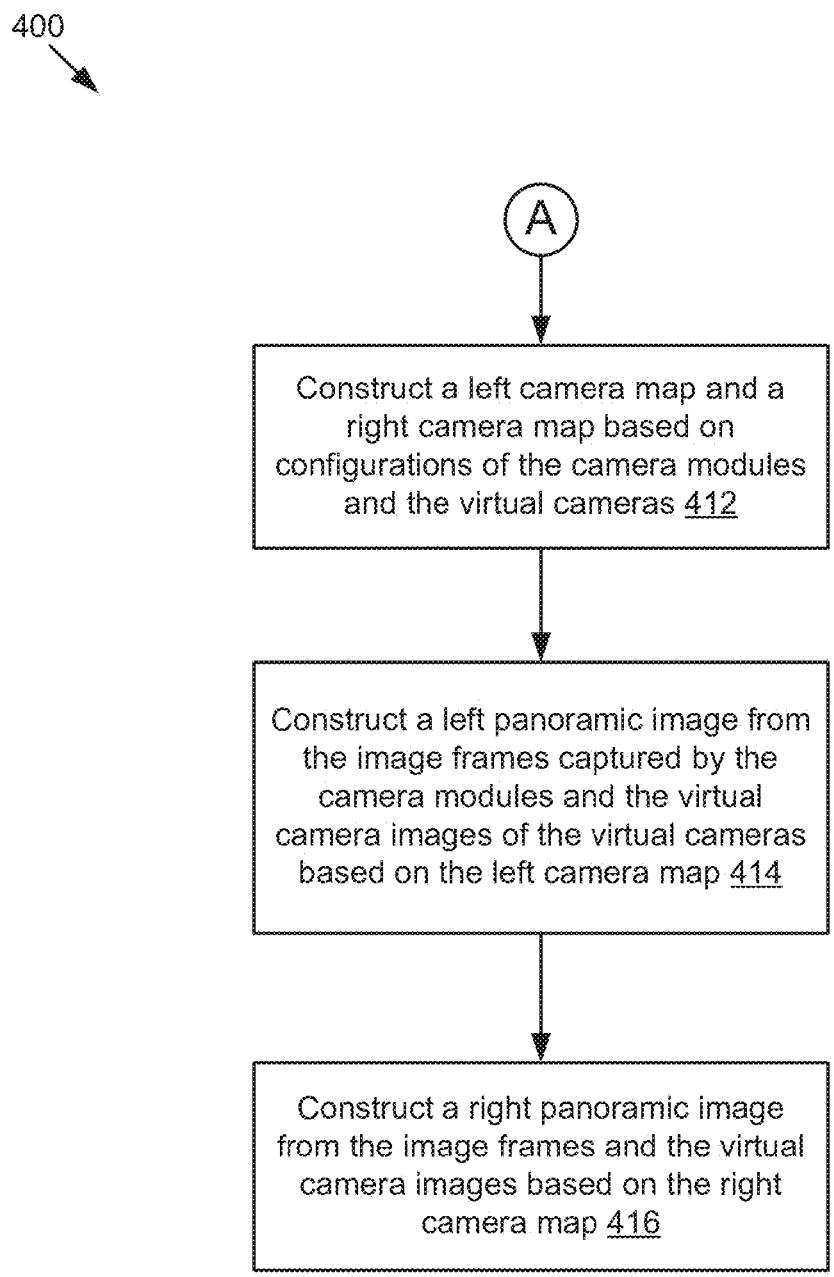

FIGS. 4A and 4B illustrate an example method 400 for stitching image frames captured at a particular time to generate a left panoramic image and a right panoramic image according to some implementations. The method 400 is described with respect to FIGS. 1 and 3. Although illustrated as discrete blocks, various blocks may be divided into additional blocks, combined into fewer blocks, or eliminated, depending on the desired implementation.

Referring to FIG. 4A, the method 400 may include the communication module 302 receiving 402 image frames that are captured by the camera modules 103 of the camera array 101 at a particular time. The communication module 302 receives 404 data describing configuration of the camera modules 103 in the camera array 101. For example, the communication module 302 receives data describing positions and orientations of the camera modules 103. The virtual camera module 306 determines different sets of neighboring camera modules 103 in the camera array 101. Each set of neighboring camera modules 103 may include two or more camera modules 103 that locate in proximity to each other in the camera array 101 and have an overlapping field of view.

For each set of neighboring camera modules, the disparity module 304 determines 406 a set of disparity maps related to the corresponding set of neighboring camera modules. The disparity module 304 generates different sets of disparity maps for different sets of neighboring camera modules. For each set of neighboring camera modules, the virtual camera module 306 determines 408 one or more virtual cameras interpolated between neighboring camera modules from the corresponding set. The virtual camera module 306 determines different virtual cameras for different sets of neighboring camera modules. For a virtual camera interpolated between a set of neighboring camera modules, the virtual camera module 306 generates 410 a virtual camera image for the virtual camera associated with the particular time by: interpolating image frames captured by the neighboring camera modules at the particular time based on (1) a set of disparity maps associated with the set of neighboring camera modules and (2) a position of the virtual camera. Similarly, the virtual camera module 306 generates virtual camera images associated with the particular time for all the virtual cameras. An example method for generating a virtual camera image associated with a particular time for a virtual camera is described below with reference to FIGS. 5A and 5B.

Referring to FIG. 4B, the camera mapping module 310 constructs 412 a left camera map and a right camera map based on configurations of the camera modules 103 in the camera array 101 and positions of the virtual cameras. The video module 312 constructs 414, based on the left camera map, a left panoramic image associated with the particular time from (1) the image frames captured by the camera modules 103 at the particular time and (2) the virtual camera images of the virtual cameras associated with the particular time. The video module 312 constructs 416, based on the right camera map, a right panoramic image associated with the particular time from (1) the image frames captured by the camera modules 103 at the particular time and (2) the virtual camera images of the virtual cameras associated with the particular time.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed implementations.

Figure 5A:
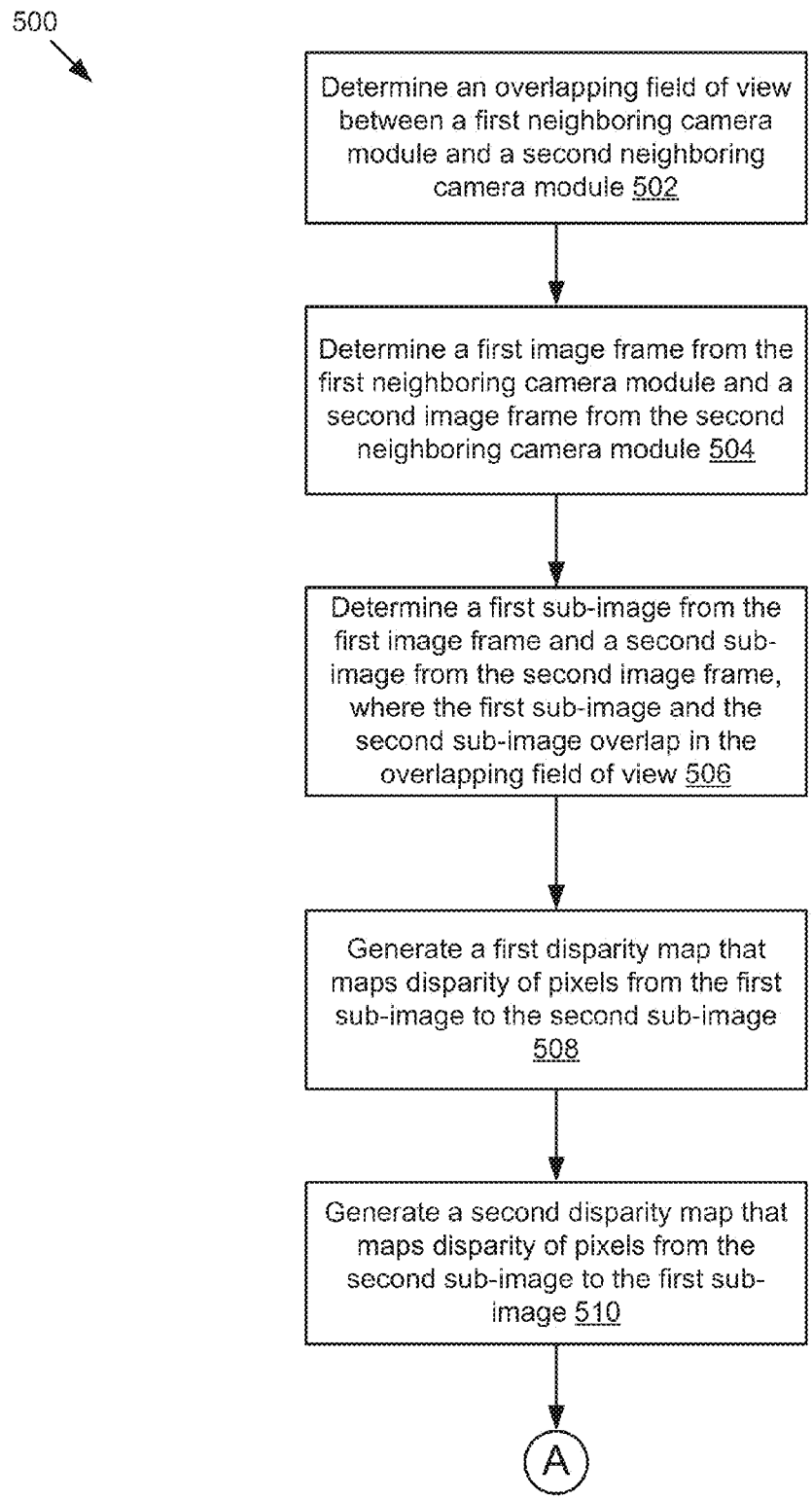
FIGS. 5A and 5B illustrate an example method for generating a virtual camera image for a virtual camera located between two neighboring camera modules according to some implementations.
Figure 5B:
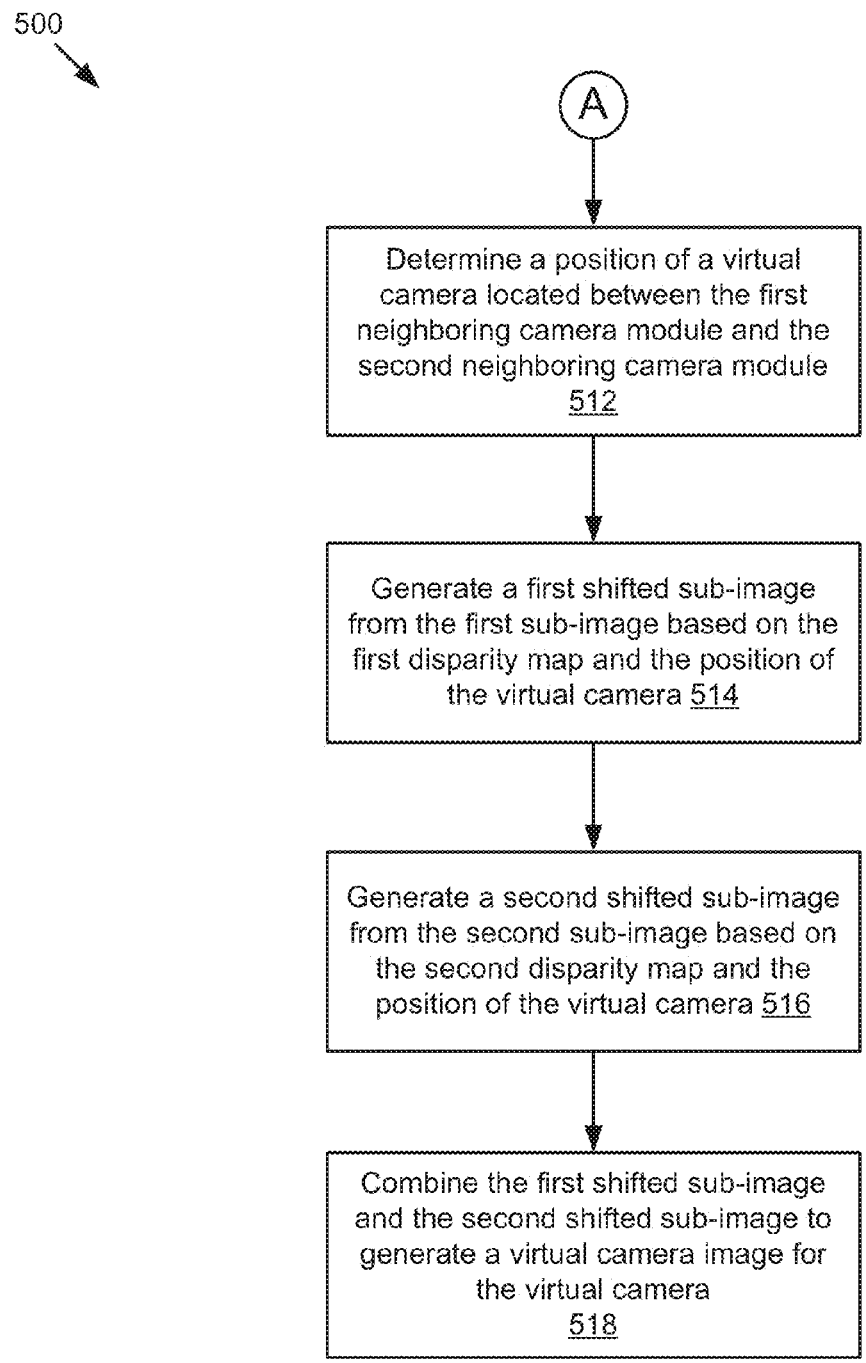

FIGS. 5A and 5B illustrate an example method 500 for generating a virtual camera image associated with a particular time for a virtual camera located between two neighboring camera modules according to some implementations. The method 500 is described with respect to FIGS. 1 and 3. Although illustrated as discrete blocks, various blocks may be divided into additional blocks, combined into fewer blocks, or eliminated, depending on the desired implementation.

Referring to FIG. 5A, the disparity module 304 determines 502 an overlapping field of view between a first neighboring camera module and a second neighboring camera module. The disparity module 304 determines 504 a first image frame captured by the first neighboring camera module and a second image frame captured by the second neighboring camera module at the particular time. The disparity module 304 determines 506 a first sub-image (e.g., Image AB) from the first image and a second sub-image (e.g., Image BA) from the second image, with the first sub-image and the second sub-image overlapping with each other in the overlapping field of view. The disparity module 304 generates 508 a first disparity map that maps disparity of pixels from the first sub-image to the second sub-image. The disparity module 304 generates 510 a second disparity map that maps disparity of pixels from the second sub-image to the first sub-image. An example method for generating a disparity map is described below with reference to FIGS. 6A and 6B.

Referring to FIG. 5B, the virtual camera module 306 determines 512 a position of a virtual camera located between the first neighboring camera module and the second neighboring camera module. The virtual camera module 306 generates 514 a first shifted sub-image from the first sub-image based on the first disparity map and the position of the virtual camera. The virtual camera module 306 generates 516 a second shifted sub-image from the second sub-image based on the second disparity map and the position of the virtual camera. The virtual camera module 306 combines 518 the first shifted sub-image and the second shifted sub-image to generate a virtual camera image associated with the particular time for the virtual camera.

Figure 6A:
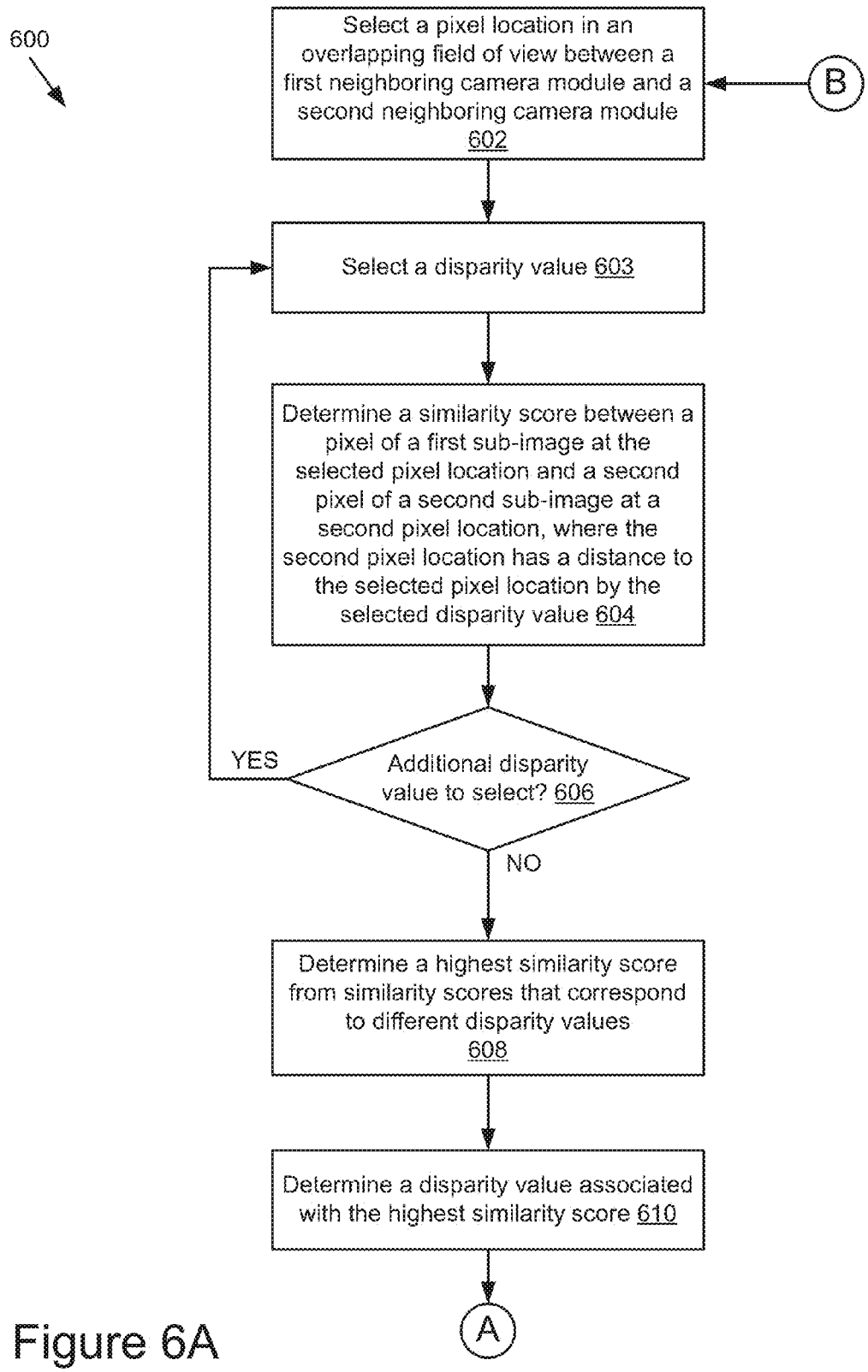
FIGS. 6A and 6B illustrate an example method for estimating a disparity map that maps disparity of pixels from a first sub-image of a first neighboring camera module to a second sub-image of a second neighboring camera module according to some implementations.
Figure 6B:
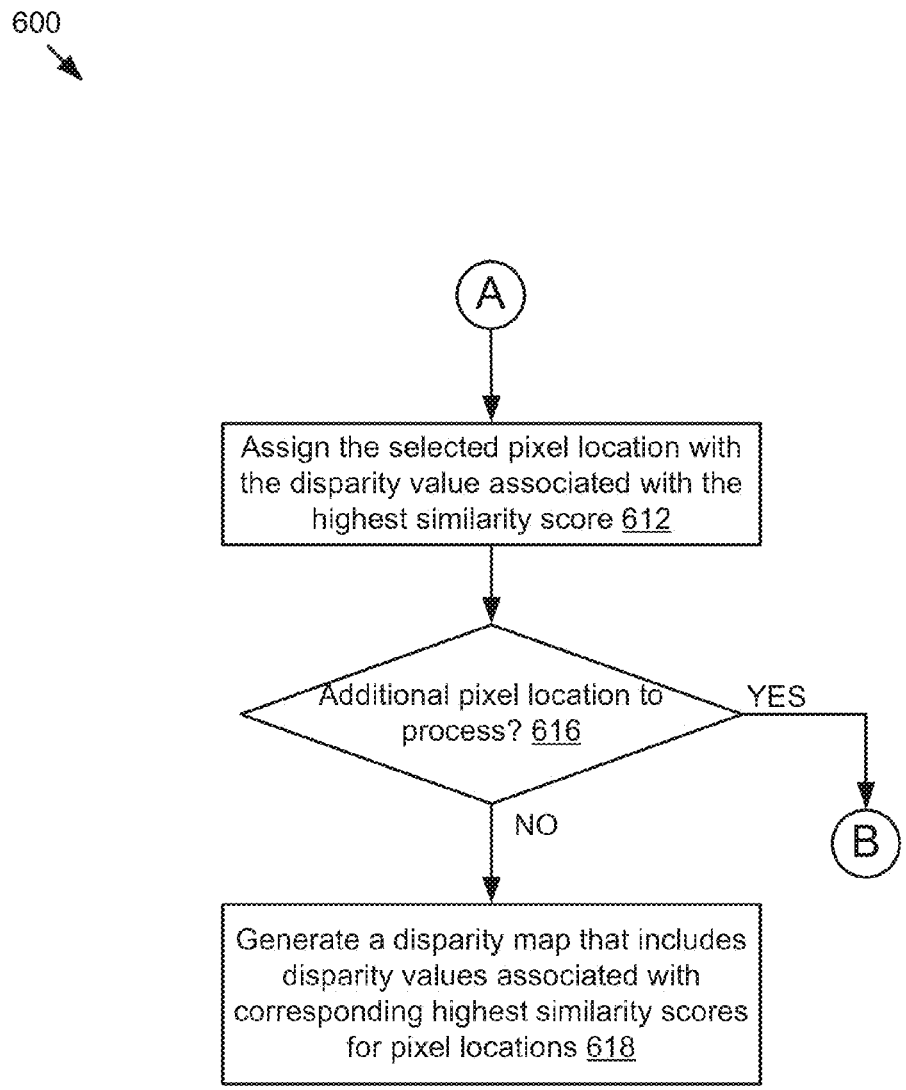

FIGS. 6A and 6B illustrate an example method 600 for estimating a disparity map that maps disparity of pixels from a first sub-image of a first neighboring camera module to a second sub-image of a second neighboring camera module according to some implementations. The method 600 is described with respect to FIGS. 1 and 3. Although illustrated as discrete blocks, various blocks may be divided into additional blocks, combined into fewer blocks, or eliminated, depending on the desired implementation.

Referring to FIG. 6A, the disparity module 304 selects 602 a pixel location in an overlapping field of view between the first neighboring camera module and the second neighboring camera module. The disparity module 304 selects 603 a disparity value. The similarity score module 308 determines 604 a similarity score between (1) a pixel of the first sub-image at the selected pixel location and (2) a second pixel of the second sub-image at a second pixel location, where the second pixel location has a distance to the selected pixel location by the selected disparity value. The determined similarity score is associated with the selected disparity value. An example method for determining similarity scores is described below with reference to FIGS. 7A and 7B.

The disparity module 304 determines 606 whether there is at least an additional disparity value to select. If there is at least an additional disparity value to select, the method 600 moves to block 603. Otherwise, the method 600 moves to block 608. As a result, different similarity scores associated with different disparity values are generated for the selected pixel location. The disparity module 304 determines 608 a highest similarity score from the similarity scores that correspond to different disparity values. The disparity module 304 determines 610 a disparity value associated with the highest similarity score.

Referring to FIG. 6B, the disparity module 304 assigns 612 the selected pixel location with the disparity value associated with the highest similarity score. The disparity module 304 determines 616 whether there is at least an additional pixel location in the overlapping field of view to process. If there is at least an additional pixel location to process, the method 600 moves to block 602. Otherwise, the method 600 moves to block 618. At block 618, the disparity module 304 generates a disparity map that includes disparity values associated with corresponding highest similarity scores for pixel locations in the disparity map.

Figure 7A:
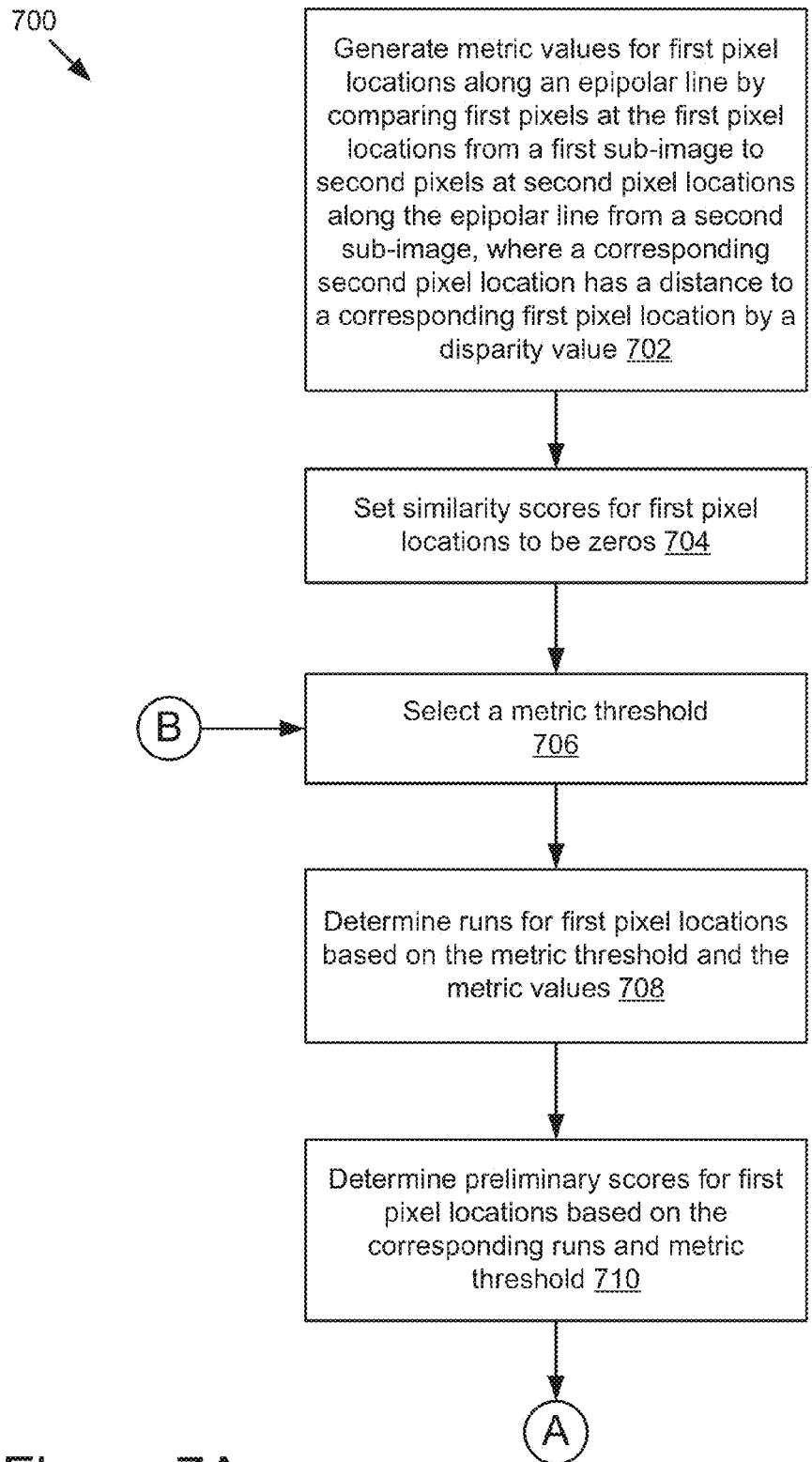
FIGS. 7A and 7B illustrate an example method for determining similarity scores for pixels along an epipolar line that connects projection centers of two neighboring camera modules according to some implementations.
Figure 7B:
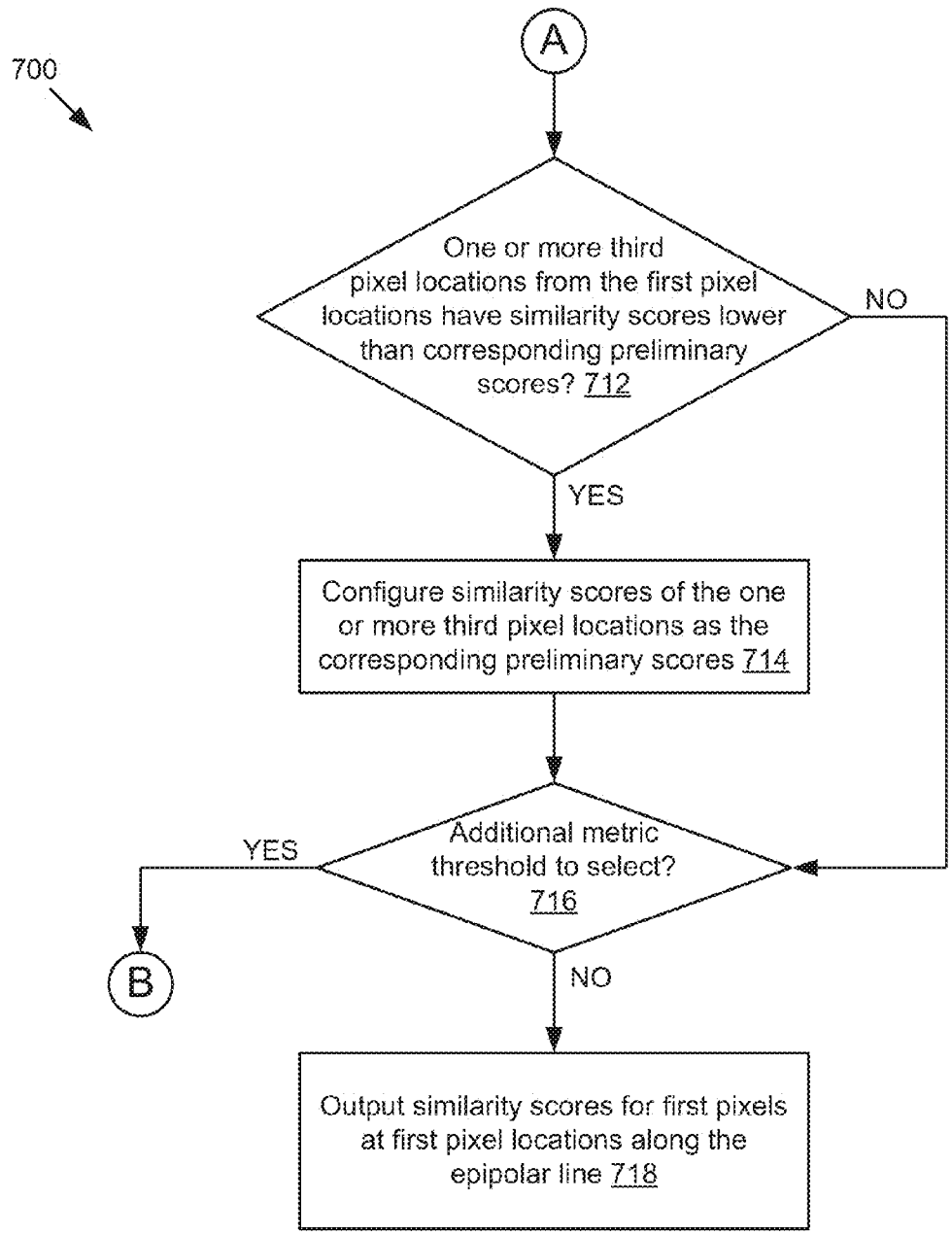

FIGS. 7A and 7B illustrate an example method 700 for determining similarity scores associated with a disparity value for pixels along an epipolar line that connects projection centers of two neighboring camera modules according to some implementations. The method 700 is described with respect to FIGS. 1 and 3. Although illustrated as discrete blocks, various blocks may be divided into additional blocks, combined into fewer blocks, or eliminated, depending on the desired implementation.

Referring to FIG. 7A, the similarity score module 308 generates 702 metric values for first pixel locations along an epipolar line by comparing (1) first pixels at the first pixel locations from a first sub-image to (2) corresponding second pixels at second pixel locations along the epipolar line from a second sub-image, respectively. A corresponding second pixel location has a distance to a corresponding first pixel location by the disparity value, and a corresponding metric value is generated for the pair of the corresponding first pixel location and the corresponding second pixel location. The first sub-image is captured by a first neighboring camera module, the second sub-image is captured by a second neighboring camera module, and the first sub-image overlaps with the second sub-image in an overlapping field of view of the first and second neighboring camera modules.

Initially, the similarity score module 308 sets 704 similarity scores for the first pixel locations to be zeros. The similarity score module 308 selects 706 a metric threshold that is used to determine runs of metric values. The similarity score module 308 determines 708 runs for the first pixel locations based on the metric threshold and the metric values. The similarity score module 308 determines 710 preliminary scores for the first pixel locations based on corresponding runs of the first pixel locations and the metric threshold. For example, a preliminary score for a corresponding first pixel location may be equal to a corresponding run of the corresponding first pixel location divided by the metric threshold.

Referring to FIG. 7B, the similarity score module 308 determines 712 whether there are one or more third pixel locations from the first pixel locations having one or more similarity scores lower than one or more corresponding preliminary scores. If the one or more third pixel locations have one or more similarity scores lower than corresponding preliminary scores, the similarity score module 308 configures 714 the one or more similarity scores for the one or more third pixel locations to be the one or more corresponding preliminary scores. Otherwise, the method 700 moves to block 716.

At block 716, the similarity score module 308 determines whether there is at least an additional metric threshold to select. If there is at least an additional metric threshold to select, the method moves to block 706. Otherwise, the method 700 moves to block 718. At block 718, the similarity score module 308 outputs similarity scores for the first pixels at the first pixel locations along the epipolar line.

Figure 8A:
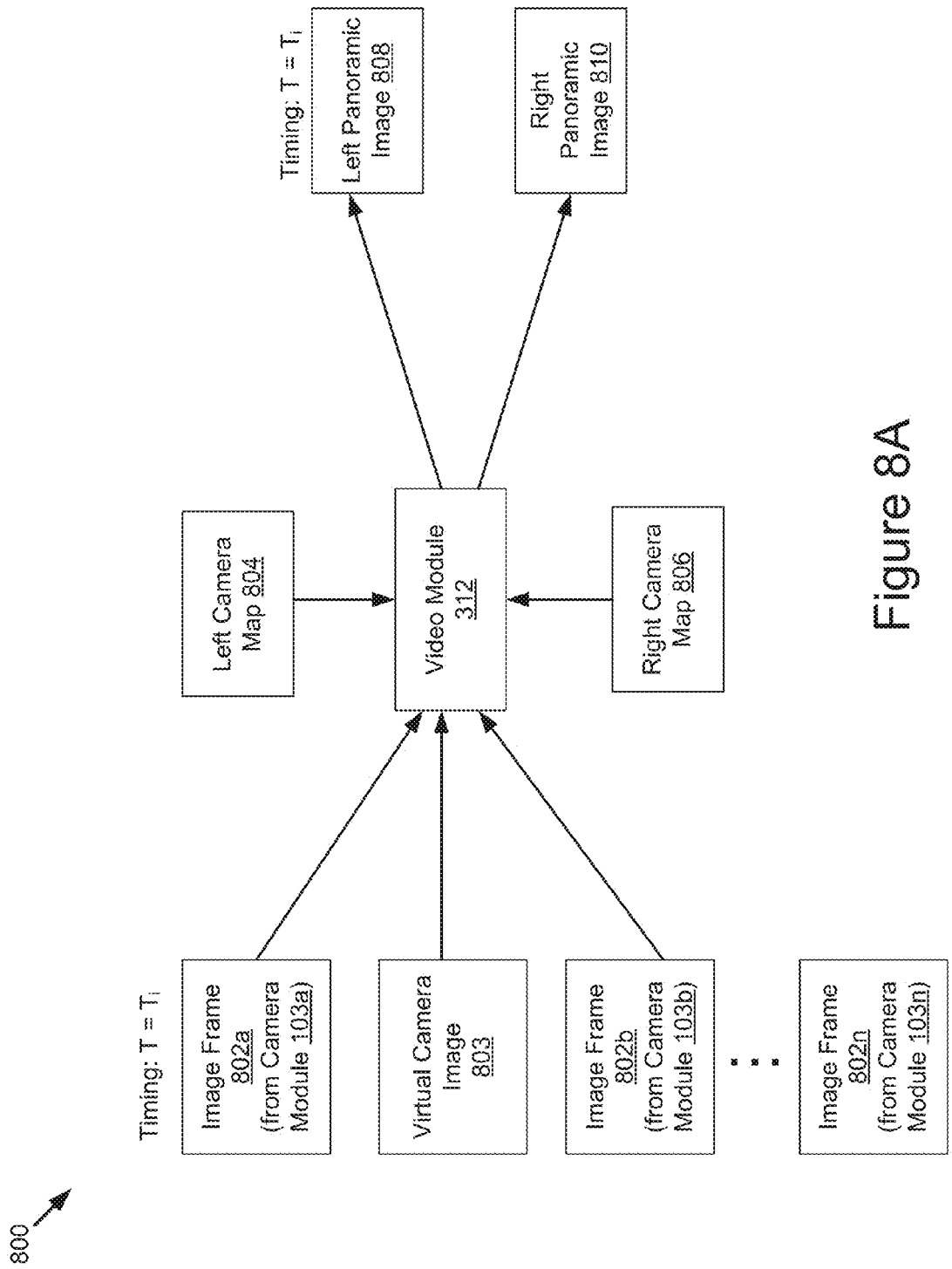
FIG. 8A illustrates an example process of generating a left panoramic image and a right panoramic image associated with a particular time according to some implementations.
Figure 8B:
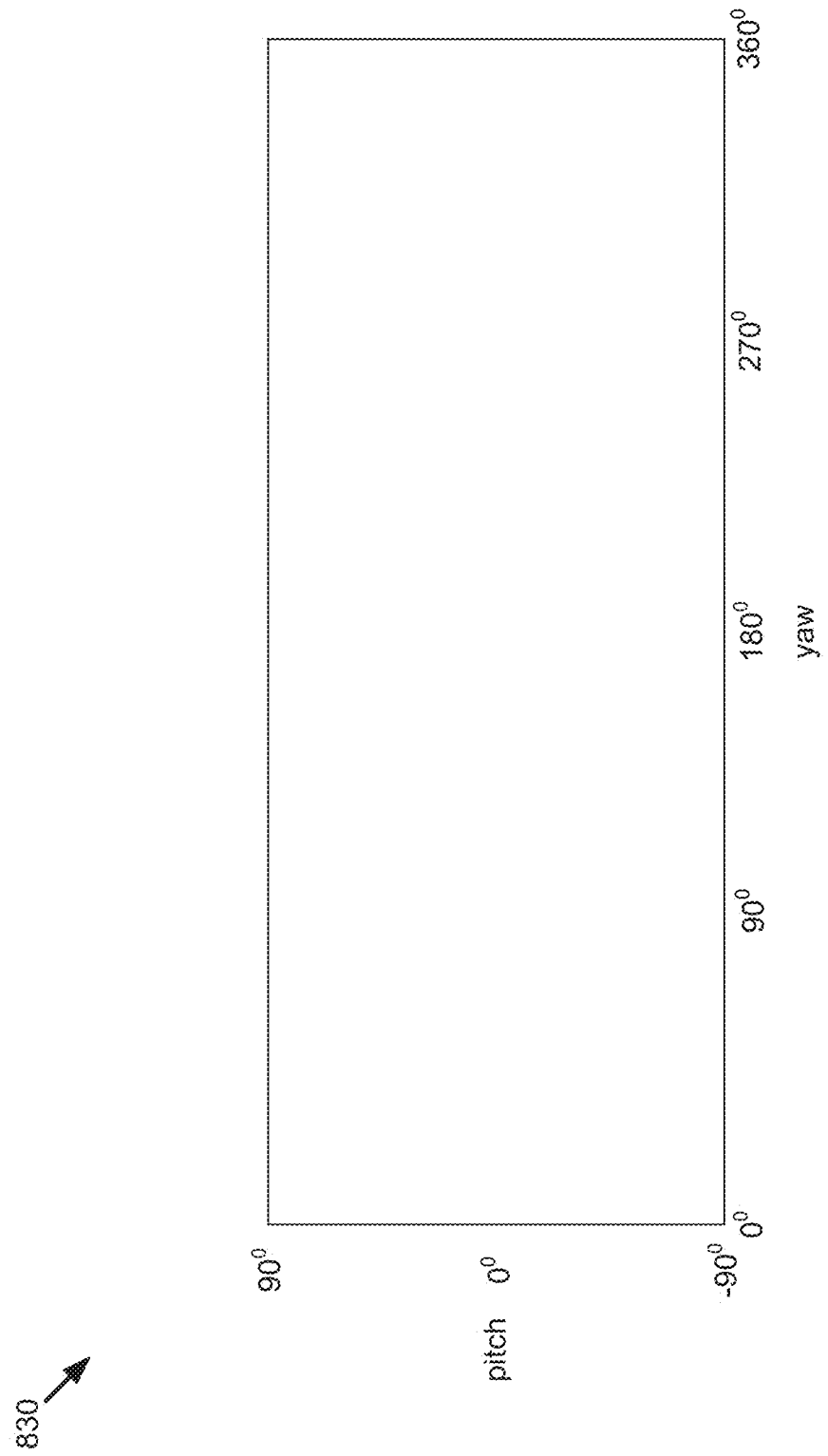
FIG. 8B is a graphic representation that illustrates an example panoramic image according to some implementations.

FIG. 8A illustrates an example process 800 of generating a left panoramic image and a right panoramic image from (1) multiple image frames that are captured by multiple camera modules at a particular time and (2) virtual camera images of virtual cameras associated with the particular time according to some implementations. At a particular time $T=T_i$ ($i=0, 1, 2, \ldots$), the camera module 103a captures an image frame 802a, the camera module 103b captures an image frame 802b, and the camera module 103n captures an image frame 802n. A virtual camera image 803 of a virtual camera located between the camera module 103a and the camera module 103b is generated. The virtual camera image 803 is associated with the particular time $T=T_i$. Other virtual camera images of other virtual cameras associated with the particular time $T=T_i$ may also be generated. The video module 312 receives the image frames 502a, 502b . . . 502n. The video module 312 stitches the image frames 502a, 502b . . . 502n, the virtual camera image 803, and other virtual camera images to generate (1) a left panoramic image 808 associated with the particular time $T=T_i$ based on a left camera map 804 and (2) a right panoramic image 810 associated with the particular time $T=T_i$ based on a right camera map 806.

FIG. 8B is a graphic representation 830 that illustrates an example panoramic image according to some implementations. The panoramic image has a first axis "yaw" which represents rotation in a horizontal plane and a second axis "pitch" which represents up and down rotation in a vertical direction. The panoramic image covers an entire 360-degree sphere of a scene panorama. A pixel at a position [yaw, pitch] in the panoramic image represents a point in a panorama viewed at a head rotation with a "yaw" value and a "pitch" value. Thus, the panoramic image includes a blended view from various head rotations rather than a single view of the scene from a single head position.

FIG. 8C is a graphic representation 850 that illustrates an example camera map according to some implementations. The example camera map maps first pixels in camera sections 852a and 852b of a panoramic image to a first camera module 103, second pixels in a camera section 854 to a virtual camera, and third pixels in a camera section 855 to a second camera module 103. The first and second camera modules 103 are neighbors in the camera array 101, and the virtual camera is interpolated between the first camera module 103 and the second camera module 103.

For the first pixels of the panoramic image within the camera sections 852a and 852b, values for the first pixels may be configured to be corresponding pixel values in a first image frame captured by the first camera module 103. Similarly, for the second pixels of the panoramic image within the camera section 854, values for the second pixels may be configured to be corresponding pixel values in a virtual camera image of the virtual camera. The virtual camera image may be generated based on the first image frame of the first camera module 103 and a second image frame of the second camera module 103. For the third pixels of the panoramic image within the camera section 855, values for the third pixels may be configured to be corresponding pixel values in the second image frame captured by the second camera module 103. In this example, the panoramic image is stitched using part of the first image frame from the first camera module 103, part of the virtual camera image of the virtual camera, part of the second image frame from the second camera module 103, and part of other images from other camera modules 103 or virtual cameras.

Figure 9A:
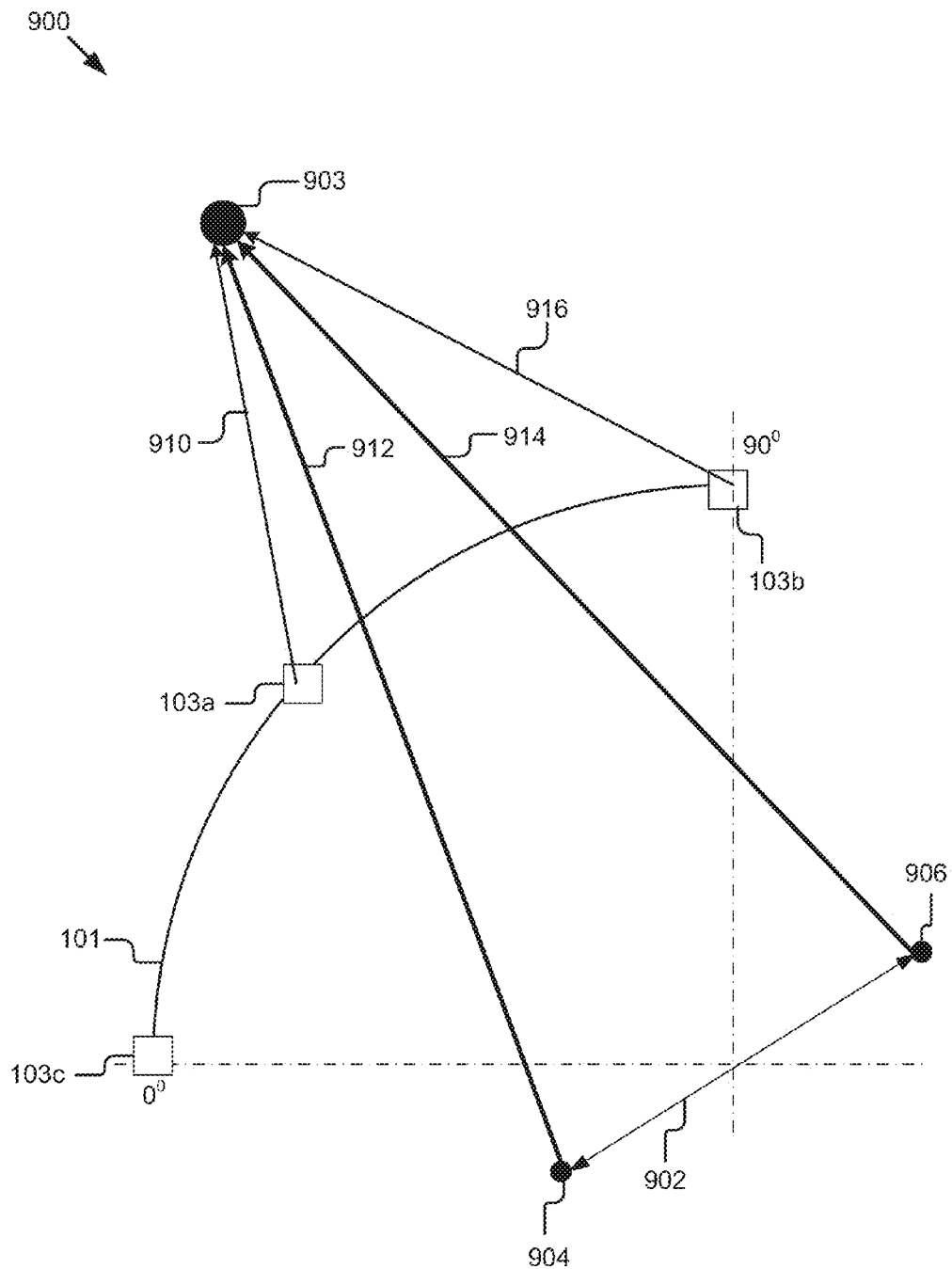
FIGS. 9A-9C are graphic representations that illustrate selection of matching cameras for a point in a panorama for construction of a left and a right camera maps according to some implementations.
Figure 9B:
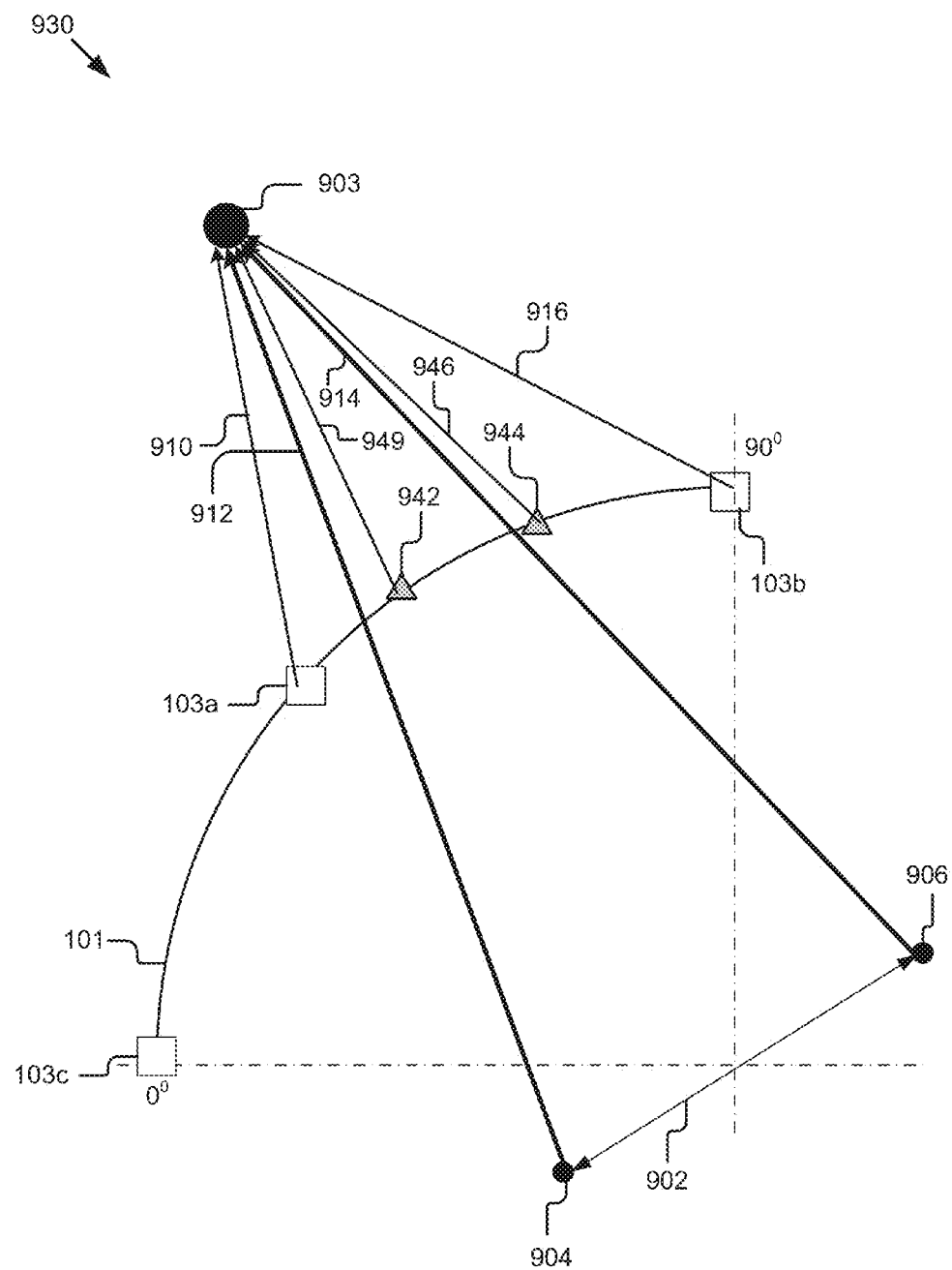
Figure 9C:
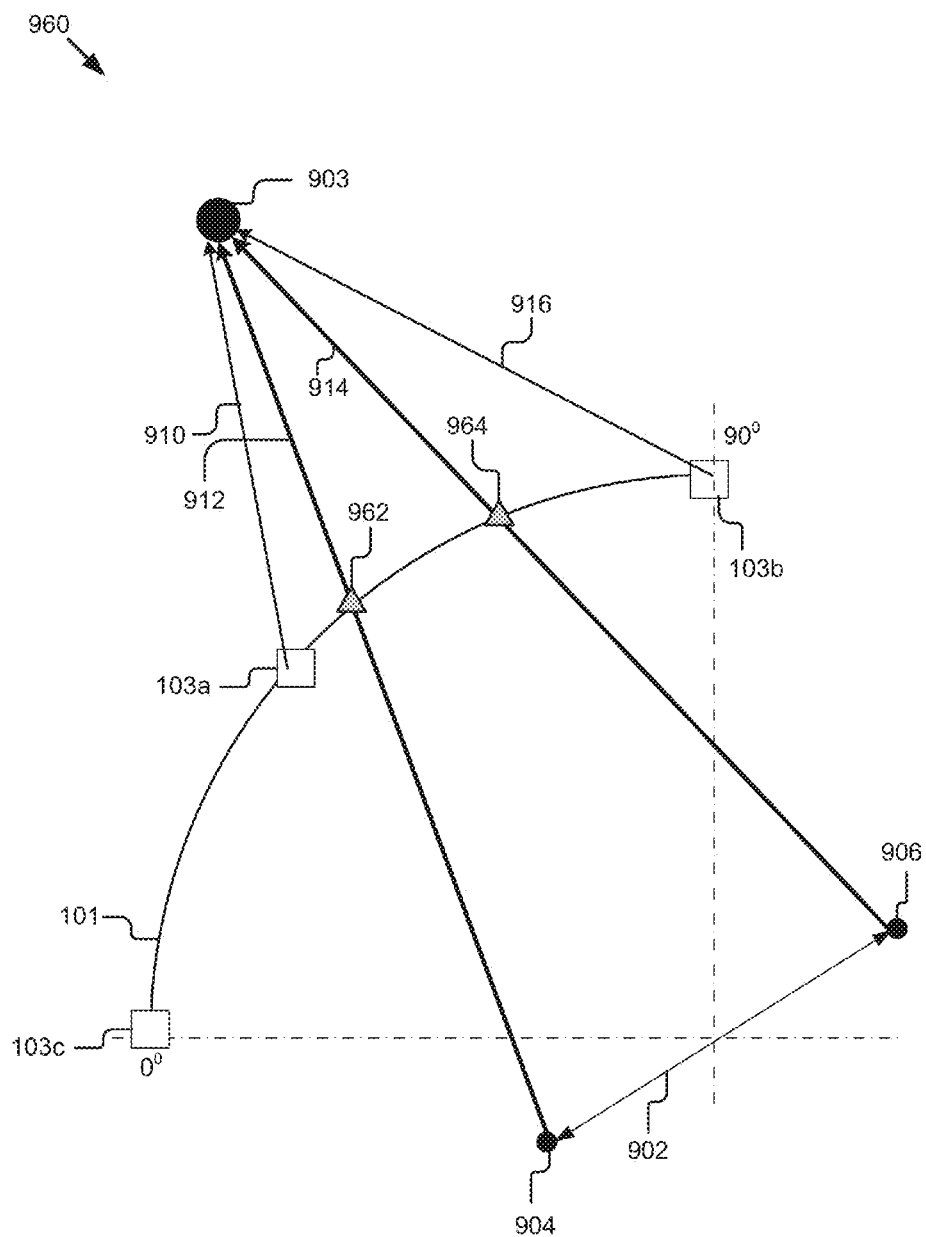

FIGS. 9A-9C are graphic representations 900, 930, and 960 that illustrate selection of matching cameras for a point in a panorama for construction of a left and a right camera maps according to some implementations. Referring to FIG. 9A, the camera array 101 includes camera modules 103a, 103b, 103c and other camera modules mounted on a spherical housing. No virtual cameras are interpolated between the camera modules. Assume that a point 903 corresponds to a head rotation position with yaw=65° and pitch=0°. An interocular distance 902 is illustrated between a left eye position 904 and a right eye position 906. Since pitch=0°, the interocular distance 902 is at its maximum value.

A left viewing direction 912 from the left eye position 904 to the point 903 and a right viewing direction 914 from the right eye position 906 to the point 903 are illustrated in FIG. 9A. The camera modules 103a and 103b have viewing directions 910 and 916 to the point 903, respectively.

Since the viewing direction 910 of the camera module 103a is more parallel to the left viewing direction 912 compared to the viewing direction 916 and other viewing directions (e.g., an angle between the viewing direction 910 and the left viewing direction 912 is smaller than angles between the left viewing direction 912 and other viewing directions), the camera module 103a may be selected as a matching camera that has a better view for the point 903 than other camera modules for constructing a left camera map. Thus, a pixel of a left panoramic image that corresponds to the point 903 may have a pixel value equal to that of a corresponding pixel in an image frame captured by the camera module 103a.

Since the viewing direction 916 of the camera module 103b is more parallel to the right viewing direction 914 compared to the viewing direction 910 and other viewing directions, the camera module 103b may be selected as a matching camera that has a better view for the point 903 than other camera modules for constructing a right camera map. Thus, a pixel of a right panoramic image that corresponds to the point 903 may have a pixel value equal to that of a corresponding pixel in an image frame captured by the camera module 103b.

Referring to FIG. 9B, virtual cameras 942 and 944 are interpolated between the camera modules 103a and 103b. The virtual camera 942 has a viewing direction 949 to the point 903, and the virtual camera 944 has a viewing direction 946 to the point 903.

Since the viewing direction 949 of the virtual camera 942 is more parallel to the left viewing direction 912 compared to the viewing directions 910, 946, 916 and other viewing directions, the virtual camera 942 may be selected as a matching camera that has a better view for the point 903 than other camera modules or virtual cameras for constructing the left camera map. Thus, a pixel of a left panoramic image that corresponds to the point 903 may have a pixel value equal to that of a corresponding pixel in a virtual camera image of the virtual camera 942.

Since the viewing direction 946 of the virtual camera 944 is more parallel to the right viewing direction 914 compared to the viewing directions 910, 949, 916 and other viewing directions, the virtual camera 944 may be selected as a matching camera that has a better view for the point 903 than other camera modules or virtual cameras for constructing the right camera map. Thus, a pixel of a right panoramic image that corresponds to the point 903 may have a pixel value equal to that of a corresponding pixel in a virtual camera image of the virtual camera 944.

Referring to FIG. 9C, assume that there are numerous virtual cameras interpolated between neighboring camera modules, which simulates to capture a panorama with continuous viewpoints. A virtual camera 962 that has the same viewing direction as the left viewing direction 912 may be selected as a matching camera for the point 903 for constructing the left camera map. Thus, a pixel of a left panoramic image that corresponds to the point 903 may have a pixel value equal to that of a corresponding pixel in a virtual camera image of the virtual camera 962. A virtual camera 964 that has the same viewing direction as the right viewing direction 914 may be selected as a matching camera for the point 903 for constructing the right camera map. Thus, a pixel of a right panoramic image that corresponds to the point 903 may have a pixel value equal to that of a corresponding pixel in a virtual camera image of the virtual camera 964.

FIG. 10 is a graphic representation 1000 that illustrates example disparity along an epipolar direction of an epipolar line according to some implementations. Camera A has a first image plane and Camera B has a second image plane. The first image plane and the second image plane are coplanar image planes. If the first and second image planes are not coplanar, images of Camera A and Camera B may be transformed to be coplanar. A pinhole location 1002 for Camera A and a pinhole location 1006 for Camera B are illustrated in FIG. 10. A point 1004 in a panorama is captured by Camera A as a point 1008 in its image plane with respect to the pinhole 1002. The point 1004 is also captured by Camera B as a point 1014 in its image plane with respect to the pinhole 1006. The point 1014 is shifted to the right with respect to the pinhole 1006. A virtual camera is added at a center point between Camera A and Camera B. The virtual camera is associated with a pinhole location 1003 which is directly above the center of the virtual camera's image plane. The pinhole location 1002 is also directly above the center of Camera A's image plane, and the pinhole location 1006 is directly above the center of Camera B's image plane. The point 1004 may be captured by the virtual camera as a point 1009 in its image plane. Since (1) the pinhole location 1003 of the virtual camera is halfway between Camera A's pinhole location 1002 and Camera B's pinhole location 1006 and (2) the image plane of the virtual camera is also halfway between Camera A's image plane and Camera B's image plane, a position of the point 1009 is halfway between positions of the points 1008 and 1014.

Figure 11:
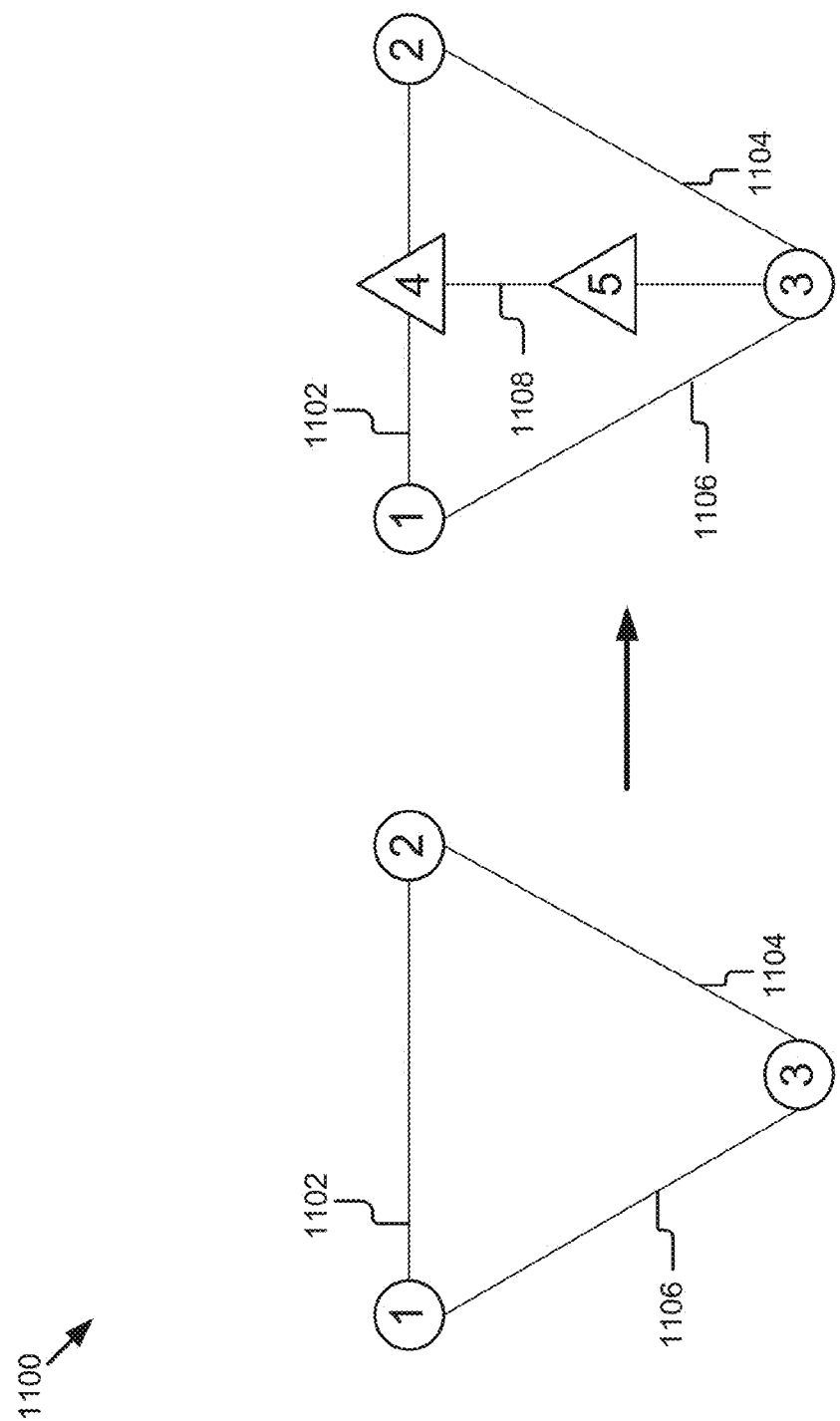
FIG. 11 is a graphic representation that illustrates interpolation of virtual cameras between real cameras and virtual cameras according to some implementations.

FIG. 11 is a graphic representation 1100 that illustrates interpolation of virtual cameras between real cameras and virtual cameras according to some implementations. Three real cameras (Camera 1, Camera 2, Camera 3) are illustrated in a left graph of FIG. 11. Views of a scene along lines 1102, 1104, and 1106 may be interpolated by two of the real cameras, respectively. The lines 1102, 1104, and 1106 each connect two of the three real cameras. Virtual cameras may be interpolated along the lines 1102, 1104, and 1106. For example, a virtual camera 4 may be interpolated along the line 1102 as illustrated in a right graph in FIG. 11. Furthermore, the virtual camera 4 may also be used to determine other virtual cameras inside a triangle formed by the three real cameras. For example, referring to the right graph in FIG. 11, a virtual camera 5 may be interpolated along a line 1108 between the virtual camera 4 and Camera 3. Similarly, other virtual cameras may be interpolated between two real cameras, between a real camera and a virtual camera, or between two virtual cameras.

The implementations described herein may include the use of a special purpose or general-purpose computer including various computer hardware or software modules, as discussed in greater detail below.

Implementations described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include tangible computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions comprise, for example, instructions and data which cause a general purpose computer, special purpose computer, or special purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general purpose hardware (e.g., computer-readable media, processing devices, etc.) of the computing system. In some implementations, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

All examples and conditional language recited herein are intended for pedagogical objects to aid the reader in understanding the disclosure and the concepts contributed by the inventor to furthering the art, and are to be construed as being without limitation to such specifically recited examples and conditions. Although implementations of the present disclosures have been described in detail, it may be understood that the various changes, substitutions, and alterations could be made hereto without departing from the spirit and scope of the disclosure.

What is claimed is:

1. A method comprising:
    receiving a first set of image frames that are captured by a first set of camera modules at a particular time, wherein (1) the first set of camera modules includes a first camera module and a second camera module that have an overlapping field of view, (2) the first set of image frames includes a first image captured by the first camera module and a second image captured by the second camera module, and (3) the first image includes a first sub-image that overlaps with a second sub-image of the second image on the overlapping field of view;
    interpolating a first virtual camera between the first camera module and the second camera module;
    determining a first set of disparity maps between the first set of camera modules by:
        determining a first disparity map that maps disparity of pixels from the first sub-image to the second sub-image;
        determining a second disparity map that maps disparity of pixels from the second sub-image to the first sub-image; and
        for each corresponding pixel location in the overlapping field of view:
            determining similarity scores between a first pixel of the first sub-image at a first pixel location and second pixels of the second sub-image at second pixel locations, wherein a corresponding distance between the first pixel location and each of the second pixel locations is equal to a different disparity value;
            determining a highest similarity score from the similarity scores;
            determining a disparity value associated with the highest similarity score; and
            assigning the disparity value associated with the highest similarity score to the first pixel location in the first disparity map;
    generating, by a processor-based computing device programmed to perform the generating, a first virtual camera image associated with the particular time for the first virtual camera from the first set of image frames, the first virtual camera image being generated based on the first set of disparity maps and a position of the first virtual camera relative to the first camera module and the second camera module; and constructing a left panoramic image and a right panoramic image associated with the particular time from the first set of image frames captured by the first set of camera modules and the first virtual camera image of the first virtual camera.

2. The method of claim 1, wherein:

the first image and the second image differ in their displacement along an epipolar line that connects projection centers of the first camera module and the second camera module; and further comprising determining the similarity scores for pixels along the epipolar line.

3. The method of claim 1, wherein generating the first virtual camera image for the first virtual camera comprises:

determining the position of the first virtual camera relative to the first and second camera modules;

generating a first shifted sub-image from the first sub-image based on the first disparity map and the position of the first virtual camera;

generating a second shifted sub-image from the second sub-image based on the second disparity map and the position of the first virtual camera; and combining the first shifted sub-image and the second shifted sub-image to generate the first virtual camera image for the first virtual camera.

4. The method of claim 1, wherein determining the first disparity map that maps disparity of pixels from the first sub-image to the second sub-image further comprises:

determining that a disparity collision occurs when third pixels of the first sub-image map to a fourth pixel of the second sub-image;

determining the similarity scores between the third pixels of the first sub-image and the fourth pixel of the second sub-image;

assigning the disparity value for a collision pixel of the third pixels with a highest similarity score of the similarity scores to the pixel location for the fourth pixel in the first disparity map; and leaving corresponding map entries blank for other collision pixels of the third pixels with lower similarity scores of the similarity scores.

5. The method of claim 1, wherein determining the second disparity map that maps disparity of pixels from the second sub-image to the first sub-image comprises:

for each corresponding pixel location in the overlapping field of view:

determining similarity scores between a third pixel of the second sub-image at a third pixel location and fourth pixels of the first sub-image at fourth pixel locations, wherein the corresponding distance between the third pixel location and each of the fourth pixel locations is equal to the different disparity value;

determining the highest similarity score from the similarity scores;

determining the disparity value associated with the highest similarity score; and assigning the disparity value associated with the highest similarity score to the third pixel location in the second disparity map.

6. The method of claim 1, further comprising:

interpolating a second virtual camera between the first virtual camera and the first camera module from the first set of camera modules;

determining a second set of disparity maps associated with the first virtual camera and the first camera module;

generating, based on the second set of disparity maps, a second virtual camera image associated with the particular time for the second virtual camera from an image frame of the first camera module and the first virtual camera image of the first virtual camera; and wherein the left panoramic image and the right panoramic image associated with the particular time are constructed from the first set of image frames captured by the first set of camera modules, the first virtual camera image of the first virtual camera, and the second virtual camera image of the second virtual camera.

7. The method of claim 1, further comprising:

interpolating a third virtual camera between a second set of camera modules;

determining a third set of disparity maps associated with the second set of camera modules;

generating, based on the third set of disparity maps, a third virtual camera image associated with the particular time for the third virtual camera from a second set of image frames that are captured by the second set of camera modules at the particular time; and wherein the left panoramic image and the right panoramic image associated with the particular time are constructed from the second set of image frames captured by the second set of camera modules, the first virtual camera image of the first virtual camera, and the third virtual camera image of the third virtual camera.

8. The method of claim 1, further comprising:

constructing a left camera map and a right camera map based on configurations of the first set of camera modules and the first virtual camera;

wherein the left panoramic image is constructed from the first set of image frames and the first virtual camera image based on the left camera map; and wherein the right panoramic image is constructed from the first set of image frames and the first virtual camera image based on the right camera map.

9. A system comprising:

one or more processors; and one or more non-transitory tangible computer readable mediums communicatively coupled to the one or more processors and storing executable instructions executable by the one or more processors to perform operations comprising:

receiving a first set of image frames that are captured by a first set of camera modules at a particular time, wherein (1) the first set of camera modules includes a first camera module and a second camera module that have an overlapping field of view, (2) the first set of image frames includes a first image captured by the first camera module and a second image captured by the second camera module, and (3) the first image includes a first sub-image that overlaps with a second sub-image of the second image on the overlapping field of view;

interpolating a first virtual camera between the first camera module and the second camera module;

determining a first set of disparity maps between the first set of camera modules by:

determining a first disparity map that maps disparity of pixels from the first sub-image to the second sub-image;

determining a second disparity map that maps disparity of pixels from the second sub-image to the first sub-image; and for each corresponding pixel location in the overlapping field of view:

determining similarity scores between a first pixel of the first sub-image at a first pixel location and second pixels of the second sub-image at second pixel locations, wherein a corresponding distance between the first pixel location and each of the second pixel locations is equal to a different disparity value;

determining a highest similarity score from the similarity scores;

determining a disparity value associated with the highest similarity score; and assigning the disparity value associated with the highest similarity score to the first pixel location in the first disparity map;

generating, based on the first set of disparity maps and a position of the first virtual camera relative to the first set of camera modules, a first virtual camera image associated with the particular time for the first virtual camera from the first set of image frames, the first virtual camera image being generated based on the first set of disparity maps and a position of the first virtual camera relative to the first camera module and the second camera module; and constructing a left panoramic image and a right panoramic image associated with the particular time from the first set of image frames captured by the first set of camera modules and the first virtual camera image of the first virtual camera.

10. The system of claim 9, wherein:

the first image and the second image differ in their displacement along an epipolar line that connects projection centers of the first camera module and the second camera module.

11. The system of claim 9, wherein the instructions executable by the one or more processors generate the first virtual camera image for the first virtual camera by:

determining the position of the first virtual camera relative to the first and second camera modules;

generating a first shifted sub-image from the first sub-image based on the first disparity map and the position of the first virtual camera;

generating a second shifted sub-image from the second sub-image based on the second disparity map and the position of the first virtual camera; and combining the first shifted sub-image and the second shifted sub-image to generate the first virtual camera image for the first virtual camera.

12. The system of claim 9, wherein the instructions executable by the one or more processors further determine the first disparity map that maps disparity of pixels from the first sub-image to the second sub-image by:

determining that a disparity collision occurs when third pixels of the first sub-image map to a fourth pixel of the second sub-image;

determining the similarity scores between the third pixels of the first sub-image and the fourth pixel of the second sub-image;

assigning the disparity value for a collision pixel of the third pixels with a highest similarity score of the similarity scores to the pixel location for the fourth pixel in the first disparity map; and leaving corresponding map entries blank for other collision pixels of the third pixels with lower similarity scores of the similarity scores.

13. The system of claim 9, wherein the instructions executable by the one or more processors determine the second disparity map that maps disparity of pixels from the second sub-image to the first sub-image by:

for each corresponding pixel location in the overlapping field of view:

determining similarity scores between a third pixel of the second sub-image at a third pixel location and fourth pixels of the first sub-image at fourth pixel locations, wherein the corresponding distance between the third pixel location and each of the fourth pixel locations is equal to the different disparity value;

determining the highest similarity score from the similarity scores;

determining the disparity value associated with the highest similarity score; and assigning the disparity value associated with the highest similarity score to the third pixel location in the second disparity map.

14. The system of claim 9, wherein the instructions executable by the one or more processors perform operations further comprising:

interpolating a second virtual camera between the first virtual camera and the first camera module from the first set of camera modules;

determining a second set of disparity maps associated with the first virtual camera and the first camera module;

generating, based on the second set of disparity maps, a second virtual camera image associated with the particular time for the second virtual camera from an image frame of the first camera module and the first virtual camera image of the first virtual camera; and wherein the left panoramic image and the right panoramic image associated with the particular time are constructed from the first set of image frames captured by the first set of camera modules, the first virtual camera image of the first virtual camera, and the second virtual camera image of the second virtual camera.

15. The system of claim 9, wherein the instructions executable by the one or more processors perform operations further comprising:

interpolating a third virtual camera between a second set of camera modules;

determining a third set of disparity maps associated with the second set of camera modules;

generating, based on the third set of disparity maps, a third virtual camera image associated with the particular time for the third virtual camera from a second set of image frames captured by the second set of camera modules at the particular time; and wherein the left panoramic image and the right panoramic image associated with the particular time are constructed from the second set of image frames captured by the second set of camera modules, the first virtual camera image of the first virtual camera, and the third virtual camera image of the third virtual camera.

16. A computer program product comprising a non-transitory computer-usable medium including a computer-readable program, wherein the computer-readable program when executed on a computer causes the computer to:
  receive a first set of image frames that are captured by a first set of camera modules at a particular time, wherein (1) the first set of camera modules includes a first camera module and a second camera module that have an overlapping field of view, (2) the first set of image frames includes a first image captured by the first camera module and a second image captured by the second camera module, and (3) the first image includes a first sub-image that overlaps with a second sub-image of the second image on the overlapping field of view;
  interpolate a first virtual camera between the first camera module and the second camera module;
  determine a first set of disparity maps between the first set of camera modules by:
    determining a first disparity map that maps disparity of pixels from the first sub-image to the second sub-image;
    determining a second disparity map that maps disparity of pixels from the second sub-image to the first sub-image; and
    for each corresponding pixel location in the overlapping field of view:
      determining similarity scores between a first pixel of the first sub-image at a first pixel location and second pixels of the second sub-image at second pixel locations, wherein a corresponding distance between the first pixel location and each of the second pixel locations is equal to a different disparity value;
      determining a highest similarity score from the similarity scores;
      determining a disparity value associated with the highest similarity score; and
      assigning the disparity value associated with the highest similarity score to the first pixel location in the first disparity map;
  generate, based on the first set of disparity maps and a position of the first virtual camera relative to the first set of camera modules, a first virtual camera image associated with the particular time for the first virtual camera from the first set of image frames, the first virtual camera image being generated based on the first set of disparity maps and a position of the first virtual camera relative to the first camera module and the second camera module; and
  construct a left panoramic image and a right panoramic image associated with the particular time from the set of image frames captured by the first set of camera modules and the first virtual camera image of the first virtual camera.

17. The computer program product of claim 16, wherein: the first image and the second image differ in their displacement along an epipolar line that connects projection centers of the first camera module and the second camera module.

18. The computer program product of claim 16, wherein generating the first virtual camera image for the first virtual camera comprises:
  determining the position of the first virtual camera relative to the first and second camera modules;
  generating a first shifted sub-image from the first sub-image based on the first disparity map and the position of the first virtual camera;
  generating a second shifted sub-image from the second sub-image based on the second disparity map and the position of the first virtual camera; and
  combining the first shifted sub-image and the second shifted sub-image to generate the first virtual camera image for the first virtual camera.

19. The computer program product of claim 16, wherein determining the first disparity map that maps disparity of pixels from the first sub-image to the second sub-image further comprises:
  determining that a disparity collision occurs when third pixels of the first sub-image map to a fourth pixel of the second sub-image;
  determining the similarity scores between the third pixels of the first sub-image and the fourth pixel of the second sub-image;
  assigning the disparity value for a collision pixel of the third pixels with a highest similarity score of the similarity scores to the pixel location for the fourth pixel in the first disparity map; and
  leaving corresponding map entries blank for other collision pixels of the third pixels with lower similarity scores of the similarity scores.

20. The computer program product of claim 16, wherein determining the second disparity map that maps disparity of pixels from the second sub-image to the first sub-image comprises:
  for each corresponding pixel location in the overlapping field of view:
    determining similarity scores between a third pixel of the second sub-image at the third pixel location and fourth pixels of the first sub-image at fourth pixel locations, wherein the corresponding distance between the pixel location and each of the second pixel locations is equal to the different disparity value;
    determining the highest similarity score from the similarity scores;
    determining the disparity value associated with the highest similarity score; and
    assigning the disparity value associated with the highest similarity score to the third pixel location in the second disparity map.

21. The computer program product of claim 16, wherein the computer-readable program when executed on the computer further causes the computer to:
  interpolate a second virtual camera between the first virtual camera and the first camera module from the first set of camera modules;
  determine a second set of disparity maps associated with the first virtual camera and the first camera module;
  generate, based on the second set of disparity maps, a second virtual camera image associated with the particular time for the second virtual camera from an image frame of the first camera module and the first virtual camera image of the first virtual camera; and
  wherein the left panoramic image and the right panoramic image associated with the particular time are constructed from the first set of image frames captured by the first set of camera modules, the first virtual camera image of the first virtual camera, and the second virtual camera image of the second virtual camera.

22. The computer program product of claim 16, wherein the computer-readable program when executed on the computer further causes the computer to:
  interpolate a third virtual camera between a second set of camera modules;

determine a third set of disparity maps associated with the second set of camera module;

generate, based on the third set of disparity maps, a third virtual camera image associated with the particular time for the third virtual camera from a second set of image frames that are captured by the second set of camera modules at the particular time; and wherein the left panoramic image and the right panoramic image associated with the particular time are constructed from the second set of image frames captured by the second set of camera modules, the first virtual camera image of the first virtual camera, and the third virtual camera image of the third virtual camera.

* * * * *